US012755711B2

(12) United States Patent
Moon et al.

(10) Patent No.: US 12,755,711 B2
(45) Date of Patent: Oct. 6, 2026

(54) DISPLAY DEVICE, METHOD OF DRIVING THE DISPLAY DEVICE, AND ELECTRONIC DEVICE INCLUDING THE DISPLAY DEVICE

(71) Applicant: Samsung Display Co., Ltd., Yongin-si (KR)

(72) Inventors: Jongdeuk Moon, Yongin-si (KR); Seung-Woon Shin, Yongin-si (KR); Ho Lee, Yongin-si (KR); Kyoungsoo Kim, Yongin-si (KR); Woon-Rok Jang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/355,251

(22) Filed: Oct. 10, 2025

(65) Prior Publication Data

US 2026/0279291 A1 Sep. 17, 2026

(30) Foreign Application Priority Data

Jan. 16, 2025 (KR) ........................ 10-2025-0006468

(51) Int. Cl.
*G09G 3/3291* (2016.01)

(52) U.S. Cl.
CPC ... *G09G 3/3291* (2013.01); *G09G 2320/0233* (2013.01); *G09G 2320/0271* (2013.01); *G09G 2320/041* (2013.01); *G09G 2330/021* (2013.01)

(58) Field of Classification Search
CPC ......... G09G 3/3291; G09G 2320/0233; G09G 2320/0271; G09G 2320/041; G09G 2330/021
See application file for complete search history.

(56) References Cited

U.S. PATENT DOCUMENTS

2022/0102963 A1* 3/2022 Takahata .................. G01K 7/16
2024/0339078 A1* 10/2024 Cho ...................... G09G 3/3233
2025/0087128 A1* 3/2025 Wu ....................... G09G 3/2074

FOREIGN PATENT DOCUMENTS

KR 10-2615886 B1 12/2023

* cited by examiner

*Primary Examiner* — Peter D McLoone
(74) *Attorney, Agent, or Firm* — Sughrue Mion, PLLC

(57) ABSTRACT

A display device senses a driving current of each of pixels to determine a temperature of a display panel, and performs a stain compensation based on the temperature of the display panel. The display device determines whether the display panel has transitioned from a first deterioration state to a second deterioration state and an average grayscale of input image data is less than a grayscale threshold value, such that the display device reduces a sensing period of the sensing current.

20 Claims, 16 Drawing Sheets

DISPLAY DEVICE, METHOD OF DRIVING THE DISPLAY DEVICE, AND ELECTRONIC DEVICE INCLUDING THE DISPLAY DEVICE

CROSS-REFERENCE TO RELATED APPLICATION

This application claims priority under 35 USC § 119 to Korean Patent Application No. 10-2025-0006468 filed on Jan. 16, 2025 in the Korean Intellectual Property Office, the disclosure of which is incorporated herein in its entirety by reference.

BACKGROUND

1. Field

Embodiments of the present disclosure relates to a display device, a method of driving the display device, and an electronic device including the display device for improving display quality.

2. Description of Related Art

In general, a display device includes a display panel and a display panel driver. The display panel includes gate lines, data lines, and pixels. The display panel driver includes a gate driver which provides a gate signal to the gate lines, a data driver which provides a data voltage to the data lines, and a driving controller which controls the gate driver and the data driver. Each of the pixels includes a driving transistor which generates a driving current, a data writing transistor which applies the data voltage for determining a magnitude of the driving current to the driving transistor, and a light emitting element which emits a light based on the driving current.

When the display device is driven, a temperature of the pixels may increase. When the temperature of the pixels increases, a threshold voltage and a mobility of the driving transistor may decrease. In this case, even if the same data voltage is applied to the driving transistor, the magnitude of the driving current may increase, resulting in higher luminance from the light emitting element. This inconsistency in luminance of the pixels relative to the data voltage may degrade the display quality of the display device.

SUMMARY

Embodiments of the present disclosure provide a display device for performing a precise temperature sensing to improve a display quality.

Embodiments of the present disclosure provide a method of driving the display device.

Embodiments of the present disclosure provide an electronic device including the display device.

In one or more embodiments of the disclosure, a display device may include: a display panel including pixels grouped into blocks; and a display panel driver configured to: sense a driving current of each of the pixels during a sensing period; determine a block temperature for each of the blocks based on a magnitude of the sensed driving current; determine whether after the display panel enters a first deterioration state in which a difference between a maximum value of the block temperature and an average value of the block temperature is greater than a first temperature threshold value, the display panel enters a second deterioration state in which the difference between the maximum value of the block temperature and the average value of the block temperature is less than a second temperature threshold value different from the first temperature threshold value, and an average grayscale of input image data is less than a grayscale threshold value; and output a data voltage compensated based on the block temperature to the pixels. Based on a determination that the display panel has transitioned from the first deterioration state to the second deterioration state, and that the average grayscale of the input image data is less than the grayscale threshold value, the display panel driver is configured to reduce a time length of a next sensing period after the sensing period, to be less than a time length of the sensing period, and output the data voltage compensated based on the block temperature and the reduced length of the next sensing period to the pixels.

In one or more embodiments of the present disclosure, a method of driving a display device may include: sensing a driving current of each of pixels included in a display panel during a sensing period, the pixels being grouped into blocks; determining a block temperature for each of the blocks based on the sensed driving current; determining whether the display panel enters a first deterioration state in which a difference between a maximum value of the block temperature and an average value of the block temperature is greater than a first temperature threshold value; determining whether the display panel enters a second deterioration state in which the difference between the maximum value of the block temperature and the average value of the block temperature is less than a second temperature threshold value different from the first temperature threshold value, and an average grayscale of input image data is less than a grayscale threshold value; and based on a determination that the display panel has transitioned from the first deterioration state to the second deterioration state, and the average grayscale of the input image data is less than the grayscale threshold value, reducing a time length of a next sensing period after the sensing period to be less than a time length of the sensing period, and outputting a data voltage compensated based on the block temperature and the reduced length of the next sensing period to the pixels.

In one or more embodiments of the present disclosure, an electronic device may include: a display panel including pixels grouped into blocks; a display panel driver configured to: sense a driving current of each of the pixels during a sensing period; determine a block temperature for each of the blocks based on a magnitude of the sensed driving current; determine whether after the display panel enters a first deterioration state in which a difference between a maximum value of the block temperature and an average value of the block temperature is greater than a first temperature threshold value, the display panel enters a second deterioration state in which the difference between the maximum value of the block temperature and the average value of the block temperature is less than a second temperature threshold value different from the first temperature threshold value, and an average grayscale of input image data is less than a grayscale threshold value; and output a data voltage compensated based on the block temperature to the pixels; and a processor configured to control the display panel driver. Based on a determination that the display panel has transitioned from the first deterioration state to the second deterioration state, and that the average grayscale of the input image data is less than the grayscale threshold value, the display panel driver is configured to reduce a time length of a next sensing period after the sensing period, to be less than a time length of the sensing period, and output the data voltage compensated based on the block temperature and the reduced length of the next sensing period to the pixels.

BRIEF DESCRIPTION OF DRAWINGS

The above and other features of embodiments of the present disclosure will become more apparent by describing in detailed embodiments thereof with reference to the accompanying drawings, in which.

DETAILED DESCRIPTION OF EMBODIMENTS

Hereinafter, embodiments of the present disclosure will be described in more detail with reference to the accompanying drawings.

Figure 1:
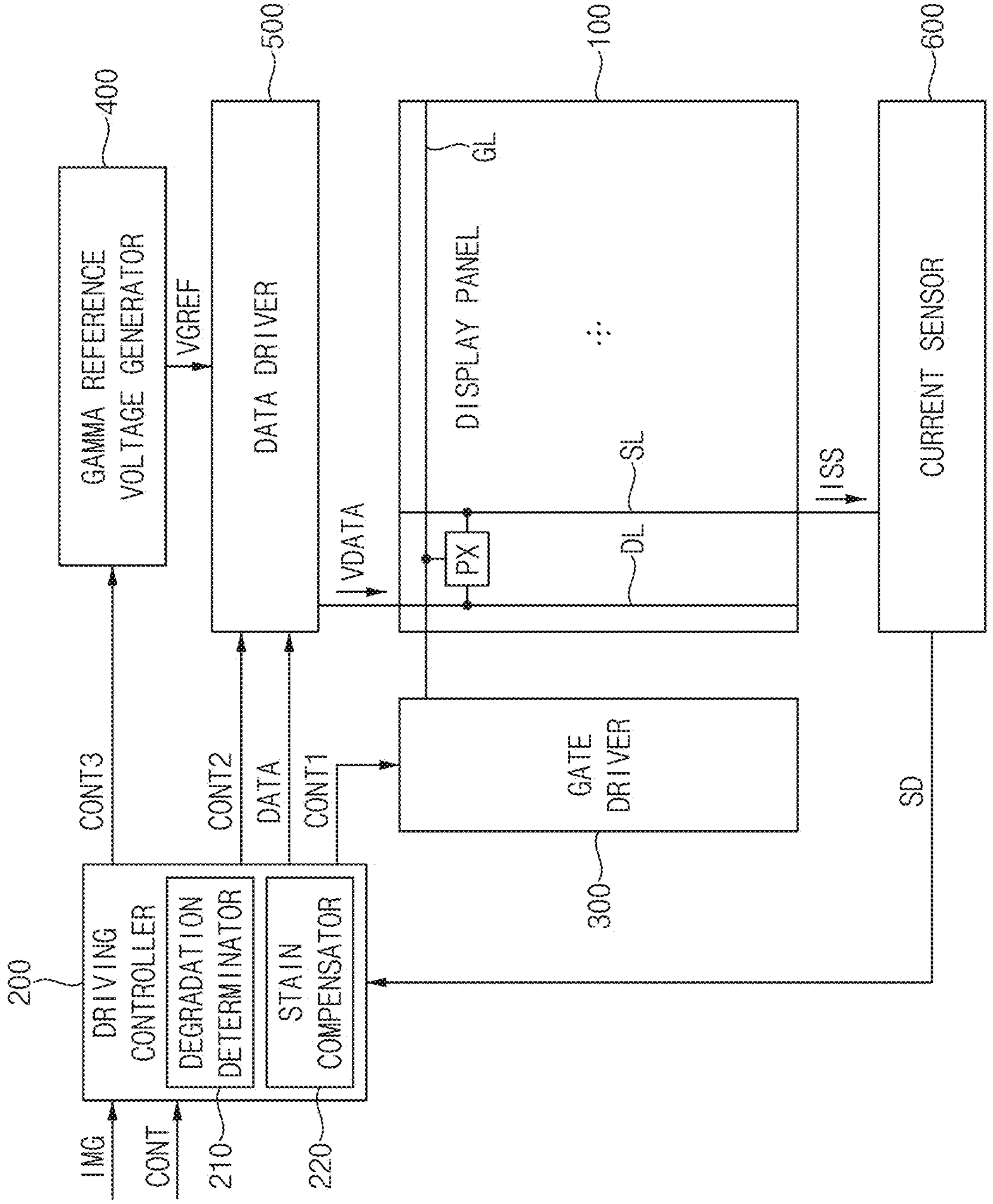
FIG. 1 is a block diagram showing a display device according to embodiments of the present disclosure.

FIG. 1 is a block diagram showing a display device according to embodiments of the present disclosure.

Referring to FIG. 1, a display device may include a display panel 100 and a display panel driver. The display panel driver may include a driving controller 200, a gate driver 300, a gamma reference voltage generator 400, and a data driver 500. In an embodiment, the display panel driver may further include a current sensor 600.

The display panel 100 may include a display area for displaying an image and a peripheral area disposed adjacent to the display area.

For example, in an embodiment, the display panel 100 may be an organic light emitting diode display panel including an organic light emitting diode. For example, the display panel 100 may be a quantum-dot organic light emitting diode display panel including an organic light emitting diode and a quantum-dot color filter. For example, the display panel 100 may be a quantum-dot nano light emitting diode display panel including a nano light emitting diode and a quantum-dot color filter.

The display panel 100 may include gate lines GL, data lines DL, sensing lines SL, and pixels PX electrically connected to the gate lines GL, the data lines DL, and the sensing lines SL, respectively. The gate lines GL may extend in a first direction, and the data lines DL and the sensing lines SL may extend in a second direction crossing the first direction.

The driving controller 200 may receive input image data IMG and an input control signal CONT from an external device. For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The gate driver 300 may generate gate signals for driving the gate lines GL in response to the first control signal CONT1 received from the driving controller 200. The gate driver 300 may output the gate signals to the gate lines GL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

For example, the gamma reference voltage generator 400 may be disposed within the driving controller 200 or may be disposed within the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

The current sensor 600 may sense a driving current of each of the pixels PX as a sensing current ISS through the sensing lines SL. The current sensor 600 may generate sensing data SD based on the sensing current ISS. The current sensor 600 may output the sensing data SD to the driving controller 200.

For example, the current sensor 600 may include an integrator and an analog-to-digital converter. The integrator may convert the sensing current ISS into a voltage having an analog type. The analog-to-digital converter may convert the voltage having the analog type into the sensing data SD having a digital type.

For example, the current sensor 600 may be disposed in the driving controller 200 or in the data driver 500.

During operation of the display device, a temperature of the pixels PX included in the display panel 100 may increase due to continuous driving. As the temperature of the pixels PX increases, the electrical characteristics of components such as the driving transistors may change. Specifically, even when the same data voltage VDATA is applied to the pixels PX, a luminance output of the pixels PX may increase beyond an intended level. This results in non-uniform brightness across the display panel, which may appear as visual irregularities or stains in the image displayed by the display device. Such irregularities and stains may be referred to as mura.

In order to prevent or mitigate the appearance of mura in the displayed image, the driving controller 200 may include a deterioration determinator 210 and a stain compensator 220. The deterioration determinator 210 may determine or estimate a temperature of the display panel 100 based on the sensing data SD, and may determine a deterioration state of the display panel 100 based on a input grayscale IG, which represents a grayscale level of the input image data IMG, or the sensing data SD. The deterioration state may include a local deterioration state (also referred to as a first deterioration state) in which a temperature of the display panel 100 (i.e., a panel temperature) locally increases in a localized area of the display panel 100 and a global deterioration (also referred to as a second deterioration state) in which the temperature of the display panel 100 globally increases across the entire display panel 100. The deterioration state will be specifically described in FIG. 3. The deterioration determinator 210 may output a deterioration state signal indicating the temperature and the deterioration state of the display panel 100 to the stain compensator 220. The stain compensator 220 may apply correction or adjustment to the input image data IMG based on the temperature and the deterioration state signal of the display panel 100 to generate the compensated data signal DATA. The data driver 500 may generate a compensated data voltage VDATA based on the compensated data signal DATA and output the compensated data voltage VDATA to the pixels PX. The driving controller 200 will be specifically described in FIG. 12.

Figure 2:
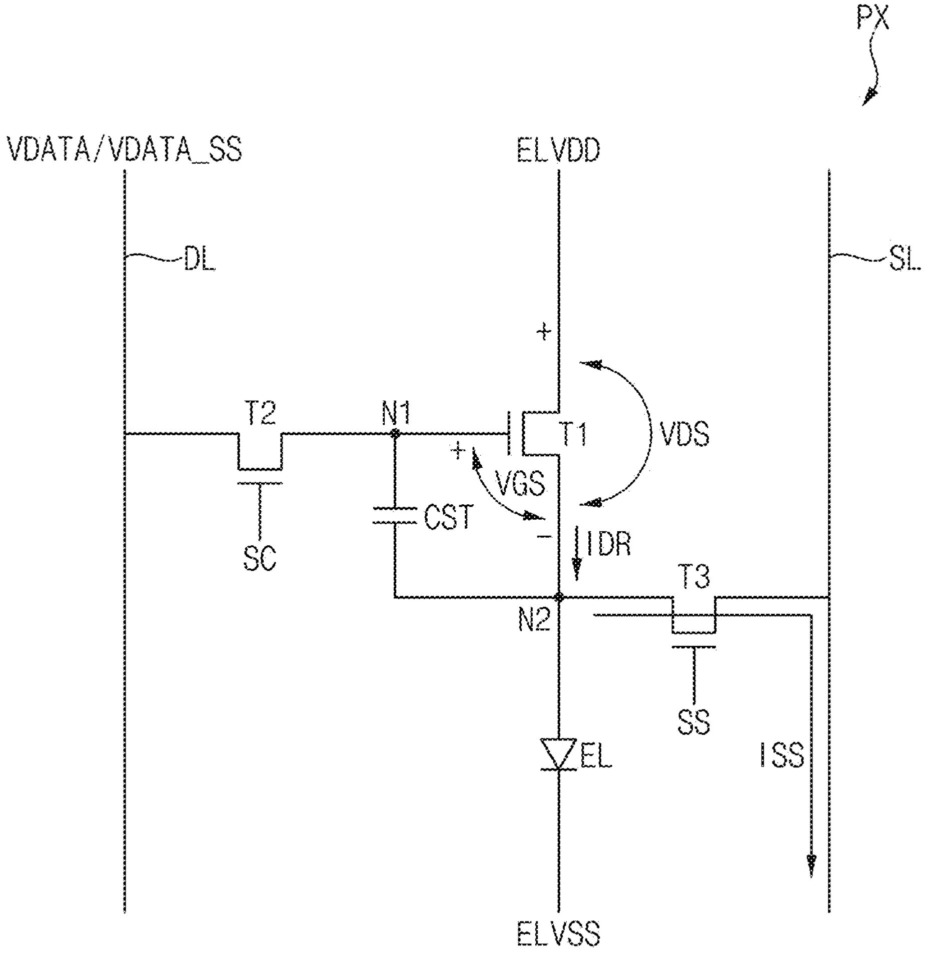
FIG. 2 is a circuit diagram showing a pixel of FIG. 1.

FIG. 2 is a circuit diagram showing a pixel PX of FIG. 1.

Referring to FIG. 1 and FIG. 2, the pixel PX may include first to third transistors T1 to T3, a storage capacitor CST, and a light emitting element EL. In an embodiment, the first to third transistors T1 to T3 may be N-type transistors. However, a pixel structure of the present disclosure is not limited thereto.

The first transistor T1 may include a gate electrode connected to a first node N1, a first electrode to which a first power supply voltage ELVDD is applied, and a second electrode connected to a second node N2. The first transistor T1 may generate a driving current IDR based on a gate-source voltage VGS of the first transistor T1 and a drain-source voltage VDS of the first transistor T1. The first transistor T1 may be referred to as a driving transistor.

The second transistor T2 may include a gate electrode to which a data write gate signal SC is applied, a first electrode connected to a data line DL transmitting a data voltage VDATA or a sensing data voltage VDATA_SS, and a second electrode connected to the first node N1. Here, the data voltage VDATA may be a voltage for expressing an image corresponding to input image data IMG, and the sensing data voltage VDATA_SS may be a voltage determined in advance for a current sensing of a current sensor 600. The second transistor T2 may output the data voltage VDATA or the sensing data voltage VDATA_SS to the first node N1 in response to the data write gate signal SC. The second transistor T2 may be referred to as a data write transistor.

The third transistor T3 may include a gate electrode to which a sensing gate signal SS is applied, a first electrode connected to a sensing line SL, and a second electrode connected to the second node N2. The third transistor T3 may output the driving current IDR as a sensing current ISS to the sensing line SL in response to the sensing gate signal SS. The third transistor T3 may be referred to as a sensing transistor.

The storage capacitor CST may include a first electrode connected to the first node N1 and a second electrode connected to the second node N2. The storage capacitor CST may store the data voltage VDATA or the sensing data voltage VDATA_SS.

The light emitting element EL may include an anode electrode connected to the second node N2 and a cathode electrode receiving a second power supply voltage ELVSS. The light emitting element EL may emit a light based on the driving current IDR. A luminance of the pixel PX may be determined based on a magnitude of the driving current IDR, which, in turn, may be determined based on a level of the data voltage VDATA or a level of the sensing data voltage VDATA_SS.

Temperature sensing may be performed to determine a temperature of the pixel PX based on a change in the sensing current ISS according to the sensing data voltage VDATA_SS. For this purpose, a same sensing data voltage VDATA_SS may be applied to the pixel PX during temperature sensing. If the temperature of the pixel PX remains constant, a same driving current IDR should be generated for the same sensing data voltage VDATA_SS. However, during operation of the display device, the temperature of the pixel PX may increase, resulting a decrease in a threshold voltage and a mobility of the first transistor T1. As a result, the driving current IDR may increase. Therefore, even when the same sensing data voltage VDATA_SS is applied to the pixel PX, an increase in pixel temperature may cause an increase in the luminance of the pixel PX. Meanwhile, when the temperature of the pixel PX increases, the driving current IDR may increase such that the sensing current ISS may increase.

Figure 3:
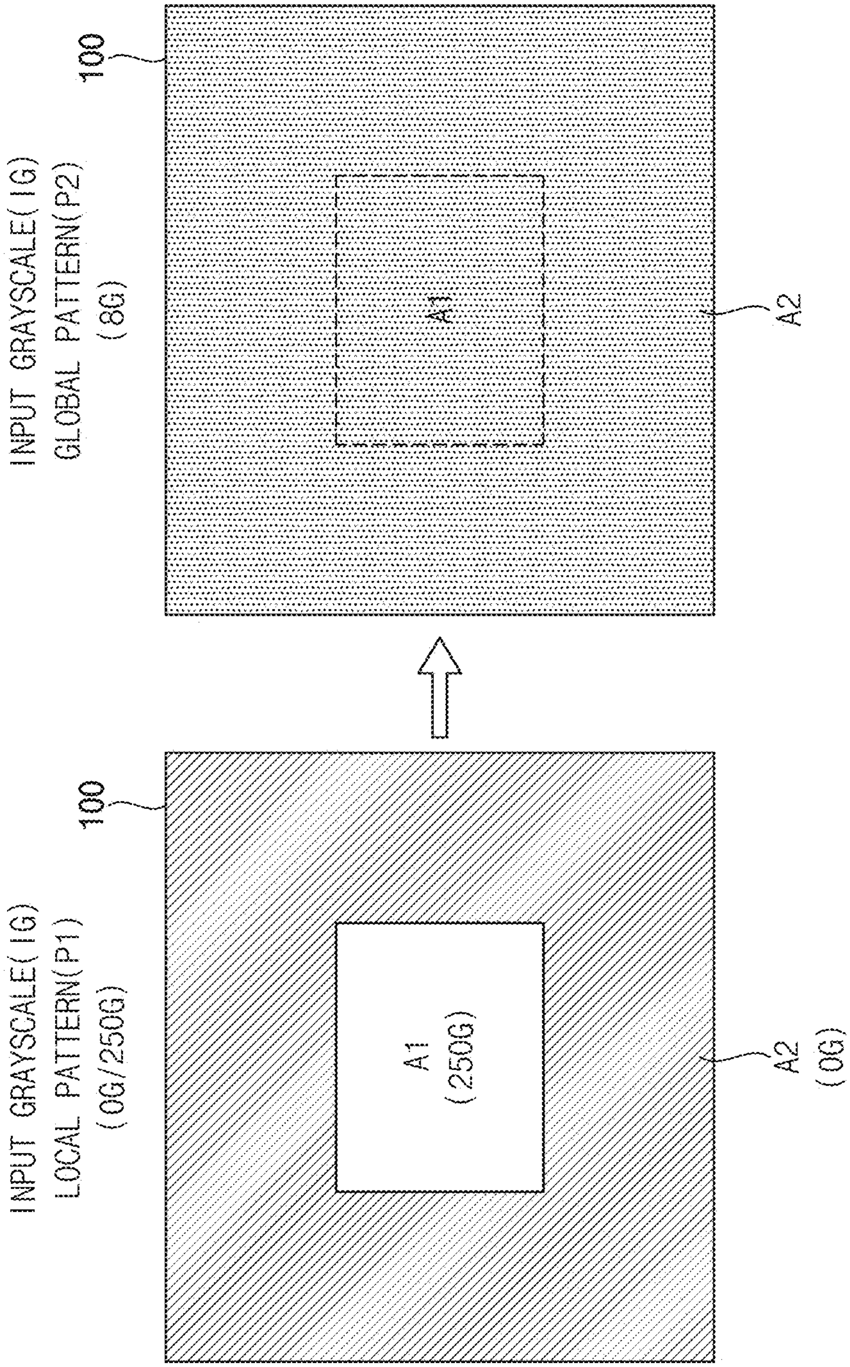
FIG. 3 is a conceptual diagram explaining an input grayscale of a local degradation and a global degradation.
Figure 4:
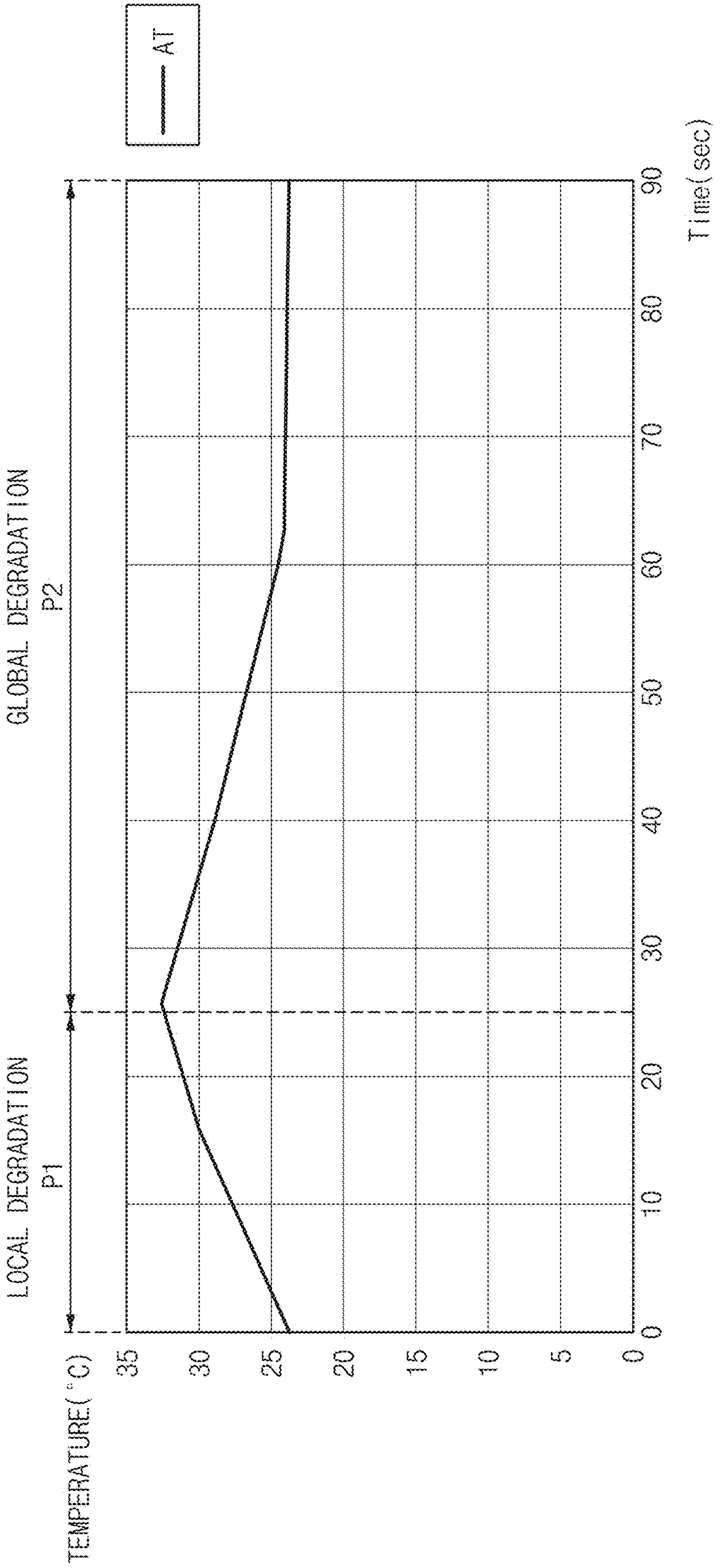
FIG. 4 is a graph showing a temperature of a first area of FIG. 3 according to a local degradation and a global degradation.
Figure 5:
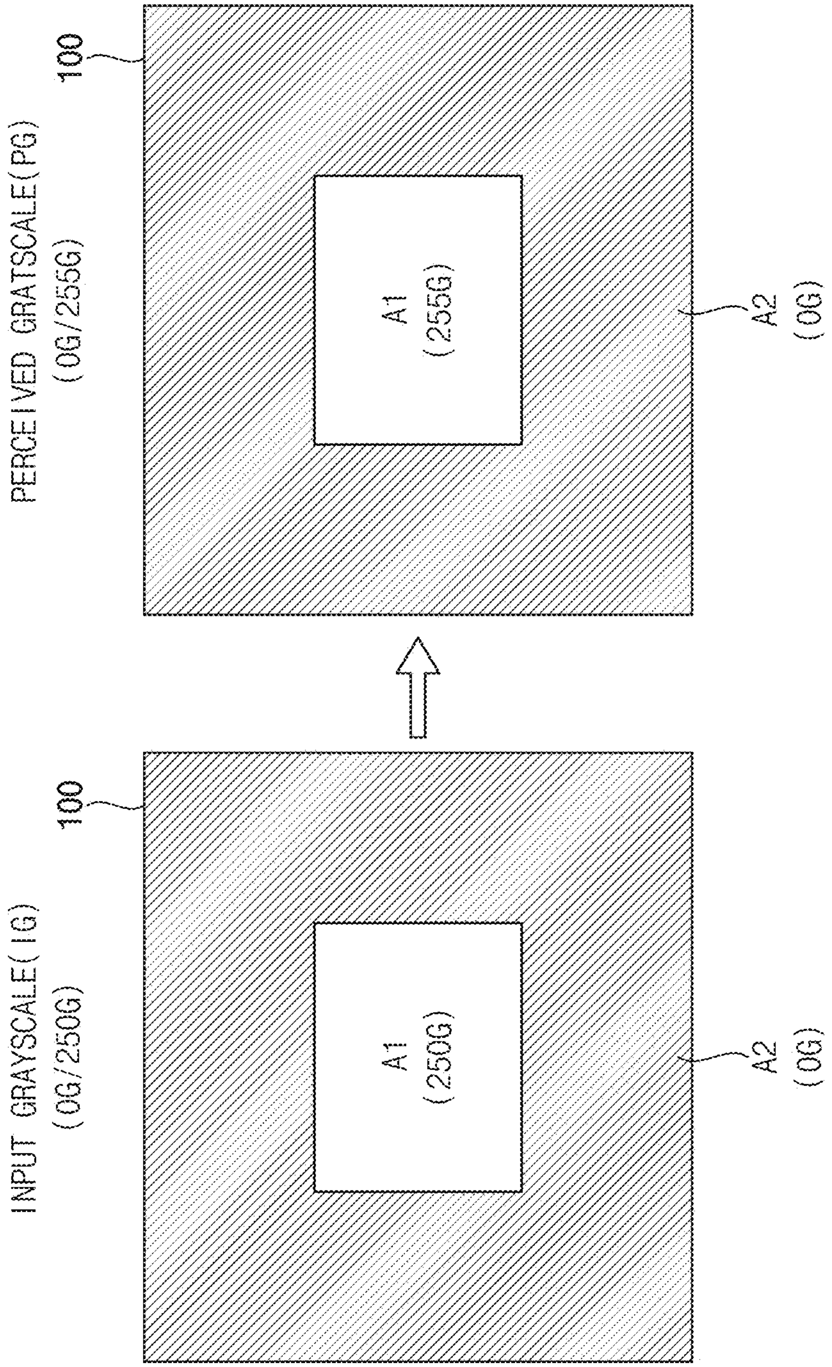
FIG. 5 is a conceptual diagram explaining a perceived grayscale of a local degradation.

FIG. 3 is a conceptual diagram explaining an input grayscale IG of a local degradation and a global degradation. FIG. 4 is a graph showing a temperature AT of a first area A1 of FIG. 3 according to a local degradation and a global degradation. FIG. 5 is a conceptual diagram explaining a perceived grayscale PG of a local degradation.

Referring to FIGS. 1 to 5, the display panel 100 may include the pixels PX, and each of the pixels PX may emit a light based on the input grayscale IG. When the input grayscale IG is large, the temperature AT of each of the pixels PX may be large, and accordingly, the luminance of each of the pixels PX may also be large. The temperature AT of each of the pixels PX is not a determination value based on a sensing operation of the current sensor 600, but represents an actual temperature of the pixels PX.

The input grayscale IG applied to each of the pixels PX may be different. Therefore, the temperature AT of each of the pixels PX may be different according to a position of the display panel 100.

For example, the input grayscale IG may be grayscales of 0 to 255. When the input grayscale IG is large, the input grayscale IG may have a high grayscale. When the input grayscale IG is small, the input grayscale IG may have a low grayscale. When the input grayscale IG is greater than a first grayscale threshold value, the driving controller 200 may determine that the input grayscale IG has the high grayscale. When the input grayscale IG is less than a second grayscale threshold value, the driving controller 200 may determine that the input grayscale IG has the low grayscale.

For example, as shown in FIG. 3, the display panel 100 may include a first area A1 and a second area A2. During a first period P1, a local pattern causing the local degradation is applied to the display panel 100. During a second period P2, a global pattern causing a global degradation and having the low grayscale may be applied to the display panel 100. A local pattern may refer to image data where a high grayscale (i.e., high brightness) is applied only to a specific portion (e.g., A1) of the display panel, while other areas (e.g., A2) receive low or zero grayscale. This creates uneven power consumption and heat generation, leading to localized aging or degradation. A global pattern may refer to image data applied uniformly across the entire panel, typically with low grayscale levels. This results in more uniform, panel-wide behavior, but at reduced luminance and thermal load.

In the first period P1, as shown in FIG. 3, an input grayscale IG of the local pattern may have the high grayscale (e.g., 250 grayscale) in the first area A1 and the low grayscale (e.g., 0 grayscale) in the second area A2. Therefore, as shown in FIG. 4, as the local degradation progresses in the first period P1, a temperature AT of the first area A1 may increase. Accordingly, as shown in FIG. 5, a luminance of the first area A1 may increase, such that a visible grayscale PG of the first area A1 may be expressed as 255 grayscale, which is greater than 250 grayscale, and the stain may be recognized in the first area A1. Therefore, in order to improve a display quality by compensating for the stain in the first area A1, the driving controller 200 may reduce the visible grayscale PG of the first area A1 from 255 grayscale to 250 grayscale, and the data driver 500 may output a compensated data voltage VDATA to the pixels PX such that a stain compensation may be performed.

In the second period P2, as shown in FIG. 3, an input grayscale IG of the global pattern may have the low grayscale (e.g., 8 grayscale) in the first area A1 and the second area A2. Therefore, as shown in FIG. 4, in the second period P2, as the global degradation with the low grayscale progresses, the temperature AT of the first area A1 may decrease.

Figure 6:
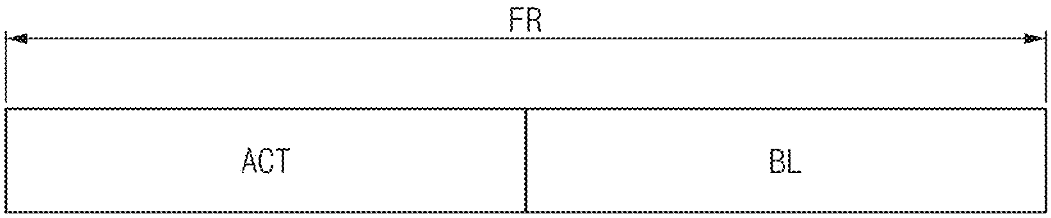
FIG. 6 is a diagram showing a frame period for a display panel of FIG. 1.
Figure 7:
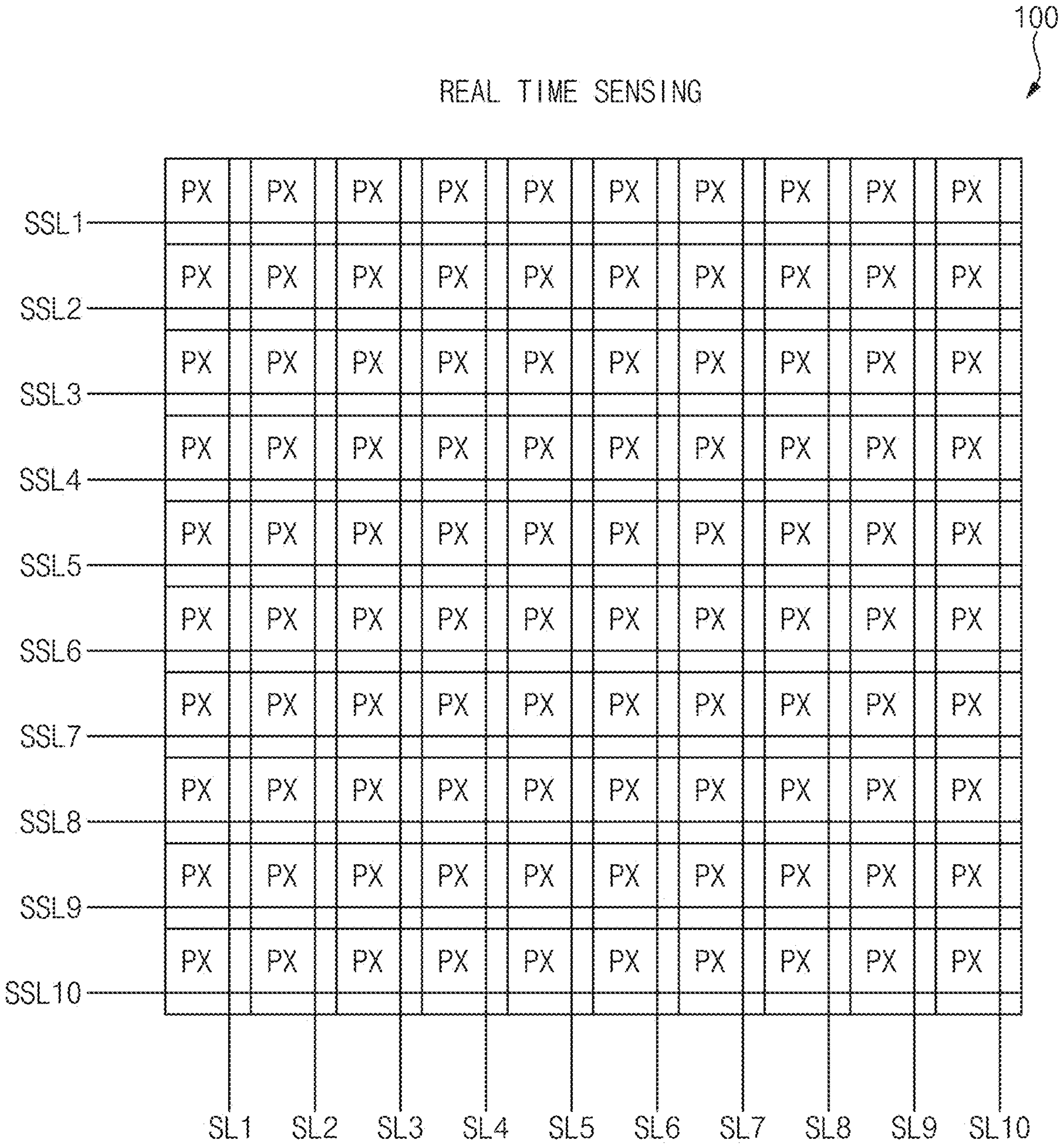
FIG. 7 is a diagram showing a sensing operation for a pixel PX of a display panel of FIG. 1.
Figure 8:
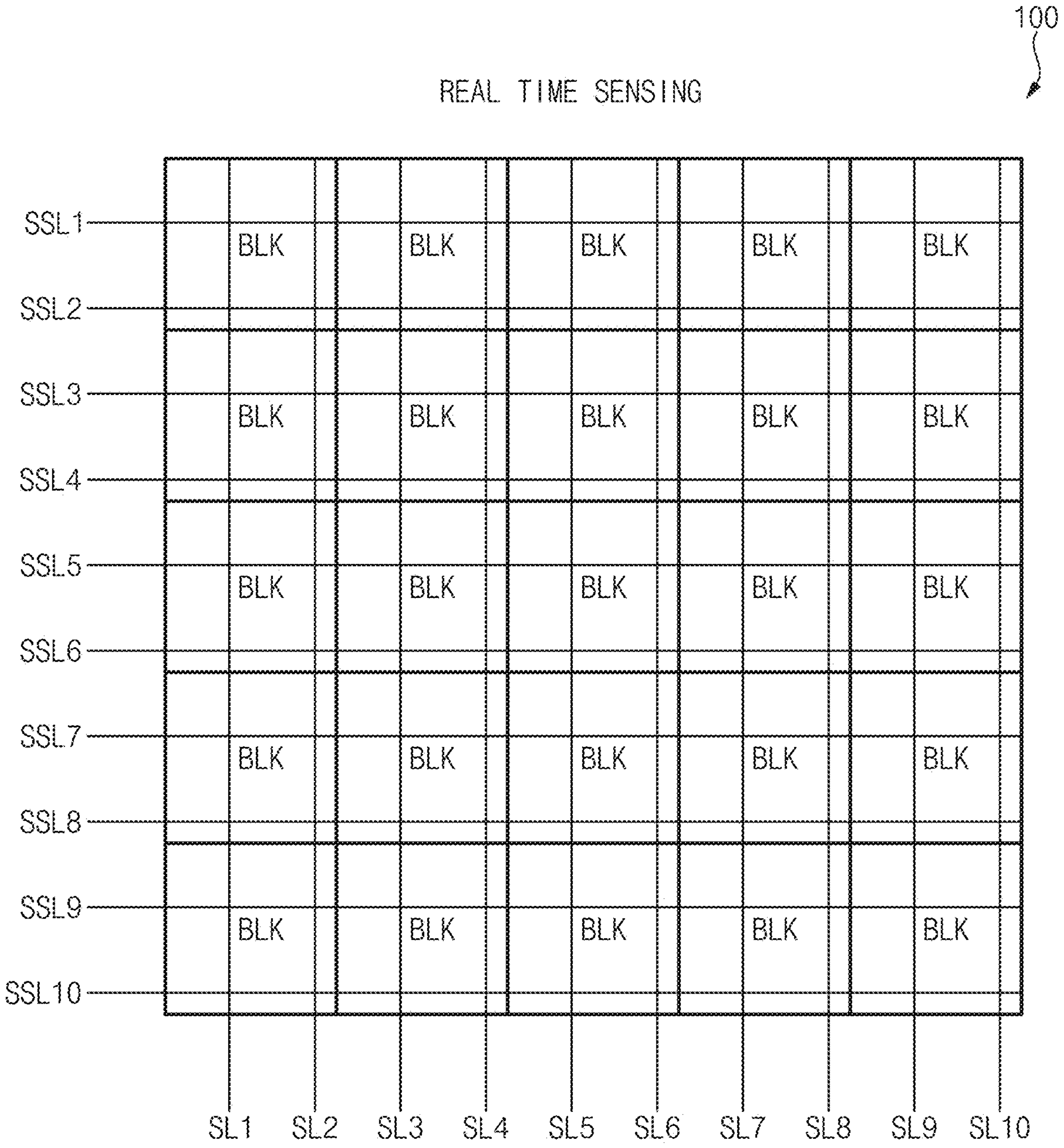
FIG. 8 is a diagram showing a sensing operation for a block of a display panel of FIG. 1.
Figure 9:
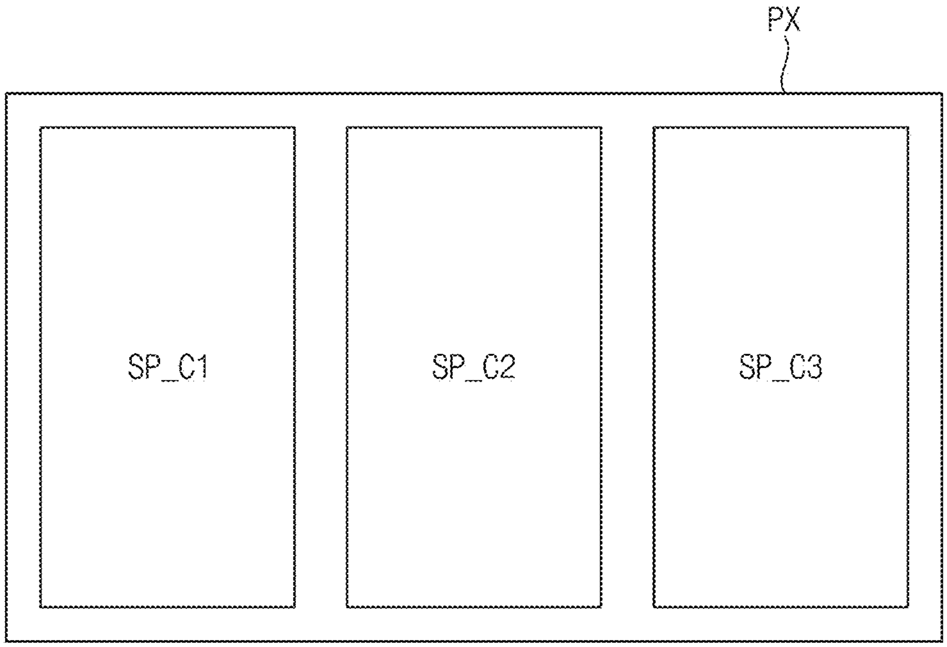
FIG. 9 is a diagram showing sub-pixels included in a pixel PX of a display panel of FIG. 1.

FIG. 6 is a diagram showing a frame period FR for a display panel 100 of FIG. 1. FIG. 7 is a diagram showing a sensing operation for a pixel PX of a display panel 100 of FIG. 1. FIG. 8 is a diagram showing a sensing operation for a block BLK of a display panel 100 of FIG. 1. FIG. 9 is a diagram showing sub-pixels SP_C1, SP_C2, SP_C3 included in a pixel PX of a display panel 100 of FIG. 1.

Referring to FIGS. 1 to 9, a frame period FR for the display panel 100 may include an active period ACT and a blank period BL. The active period ACT may refer to a time period during which the data voltage VDATA is applied to the pixels PX, and the blank period BL may refer to a time period during which the data voltage VDATA is not applied to the pixels PX.

The display panel 100 may include the pixels PX. FIG. 7 shows an example of a display panel 100 including 100 pixels PX disposed in a matrix form of 10 pixel rows and 10 pixel columns, but embodiments of the present disclosure is not limited thereto.

Each of the pixels PX may be connected to a sensing gate line SSL1 to SSL10 transmitting the sensing gate signal SS and the sensing line SL1 to SL10 transmitting the sensing current ISS. For example, pixels PX included in a first pixel row may be connected to a first sensing gate line SSL1 and may be connected to first to tenth sensing lines SL1 to SL10. For example, pixels PX included in a second pixel row may be connected to a second sensing gate line SSL2 and may be connected to the first to tenth sensing lines SL1 to SL10. For example, pixels PX included in a third pixel row may be connected to a third sensing gate line SSL3 and may be connected to the first to tenth sensing lines SL1 to SL10. For example, pixels PX included in a fourth pixel row may be connected to a fourth sensing gate line SSL4 and may be connected to the first to tenth sensing lines SL1 to SL10. For example, pixels PX included in a fifth pixel row may be connected to a fifth sensing gate line SSL5 and may be connected to the first to tenth sensing lines SL1 to SL10. For example, pixels PX included in a sixth pixel row may be connected to a sixth sensing gate line SSL6 and may be connected to the first to tenth sensing lines SL1 to SL10. For example, pixels PX included in a seventh pixel row may be connected to a seventh sensing gate line SSL7 and may be connected to the first to tenth sensing lines SL1 to SL10. For example, pixels PX included in an eighth pixel row may be connected to an eighth sensing gate line SSL8 and may be connected to the first to tenth sensing lines SL1 to SL10. For example, pixels PX included in a ninth pixel row may be connected to a ninth sensing gate line SSL9 and may be connected to the first to tenth sensing lines SL1 to SL10. For example, pixels PX included in a tenth pixel row may be connected to a tenth sensing gate line SSL10 and may be connected to the first to tenth sensing lines SL1 to SL10.

The driving controller 200 may randomly select a sensing pixel, on which a sensing is to be performed, among the pixels PX, and the current sensor 600 may sense a driving current IDR of the sensing pixel in the blank period BL. For example, the driving controller 200 may randomly select the second pixel row among the first to tenth pixel rows, and the current sensor 600 may sense a driving current IDR of each of pixels PX included in the second pixel row in the blank period BL. A sensing operation of the current sensor 600 in the blank period BL may be referred to as real time sensing.

In another embodiment, the sensing operation of the current sensor 600 may be performed in a unit of a block BLK.

The display panel 100 may be divided into blocks BLK. Each of the blocks BLK may include at least one pixel PX. FIG. 8 shows an example of a display panel 100 divided into 25 blocks BLK disposed in a matrix form of five block rows and five block columns, and each of the blocks BLK including four pixels PX disposed in a matrix form of two pixel rows and two pixel columns, but embodiments of the present disclosure is not limited thereto.

Each of the blocks BLK may be connected to the sensing gate lines SSL1 to SSL10 transmitting the sensing gate signal SS and the sensing lines SL1 to SL10 transmitting the sensing current ISS. For example, blocks BLK included in a first block row may be connected to the first and second sensing gate lines SSL1, SSL2, and may be connected to the first to tenth sensing lines SL1 to SL10. For example, blocks BLK included in a second block row may be connected to the third and fourth sensing gate lines SSL3, SSL4, and may be connected to the first to tenth sensing lines SL1 to SL10. For example, blocks BLK included in a third block row may be connected to the fifth and sixth sensing gate lines SSL1, SSL2, and may be connected to the first to tenth sensing lines SL1 to SL10. For example, blocks BLK included in a fourth block row may be connected to the seventh and eighth sensing gate lines SSL7, SSL8 and connected to the first to tenth sensing lines SL1 to SL10. For example, blocks BLK included in a fifth block row may be connected to the ninth and tenth sensing gate lines SSL9, SSL10 and connected to the first to tenth sensing lines SL1 to SL10.

The driving controller 200 may randomly select a sensing block, on which the sensing is to be performed, among the blocks BLK, and the current sensor 600 may sense a driving current IDR of each of pixels PX included in the sensing block in the blank period BL. For example, the driving controller 200 may randomly select the first block row among the first to fifth block rows, and the current sensor 600 may sense a driving current IDR of each of pixels PX included in blocks BLK included in the first block row in the blank period BL. The sensing operation of the current sensor 600 in the blank period BL may be referred to as the real time sensing.

In an embodiment, the current sensor 600 may sense a driving current IDR of each of pixels PX included in at least one of pixel rows included in the sensing block. For example, the driving controller 200 may randomly select a first pixel row among pixel rows included in the blocks BLK included in the first block row, and the current sensor 600 may sense a driving current IDR of each of pixels PX included in the first pixel row among the pixel rows included in the blocks BLK included in the first block row in the blank period BL. For example, the driving controller 200 may randomly select the first pixel row among pixel rows included in the blocks BLK included in the first block row, and the current sensor 600 may sense a driving current IDR of each of the pixels PX included in the first and second pixel rows among the pixel rows included in the blocks BLK included in the first block row in the blank period BL.

Each of the pixels PX may include sub-pixels SP_C1, SP_C2, and SP_C3. In an embodiment, each of the pixels PX may include first to third sub-pixels SP_C1, SP_C2, and SP_C3. The first sub-pixel SP_C1 may express a first color, the second sub-pixel SP_C2 may express a second color, and the third sub-pixel SP_C3 may express a third color. For example, the first sub-pixel SP_C1 may be a red sub-pixel, and the first color may be red. For example, the second sub-pixel SP_C2 may be a green sub-pixel, and the second color may be green. For example, the third sub-pixel SP_C3 may be a blue sub-pixel, and the third color may be blue.

In an embodiment, the driving controller 200 may select all of the first to third sub-pixels SP_C1, SP_C2, and SP_C3, and the current sensor 600 may sense a driving current IDR of all of the first to third sub-pixels SP_C1, SP_C2, and SP_C3. However, in order to reduce a time required for the sensing operation, in another embodiment, the driving controller 200 may select any one of the first to third sub-pixels SP_C1, SP_C2, and SP_C3, and the current sensor 600 may sense a driving current IDR of only any one of the first to third sub-pixels SP_C1, SP_C2, and SP_C3. In an embodiment, one of the first to third sub-pixels SP_C1, SP_C2, and SP_C3 may be the first sub-pixel SP_C1, and the first sub-pixel SP_C1 may be the red sub-pixel. A driving current IDR of the first sub-pixel SP_C1 may be sensed earlier than a driving current IDR of the second sub-pixel SP_C2 and a driving current IDR of the third sub-pixel SP_C3.

The driving controller 200 may determine a temperature AT of the blocks BLK based the sensing data SD, which is generated based on the driving current IDR, and calculate a determination temperature DT of the blocks BLK, based on the determined temperature AT of the blocks BLK. For example, when the driving current IDR of each of the pixels PX included in the sensing block is relatively large, the determination temperature DT of the sensing block may be large, reflecting increased local heat generation. Various implementation scenarios for calculating the determination temperature DT may include an averaging method in which the determination temperature DT may be calculated as the average of the sensed temperatures or driving currents of all pixels within a sensing block, a peak value method in which the determination temperature DT may be set as the maximum temperature or driving current detected among the pixels in the block, a weighted average method in which the determination temperature DT may be calculated by applying a weight to each pixel's temperature or current based on its position or historical degradation level, and a mapping method in which the determination temperature DT may be derived from a look-up table that maps sensing data (e.g., the driving current IDR and/or the sensing current ISS) to estimated temperature values.

Figure 10:
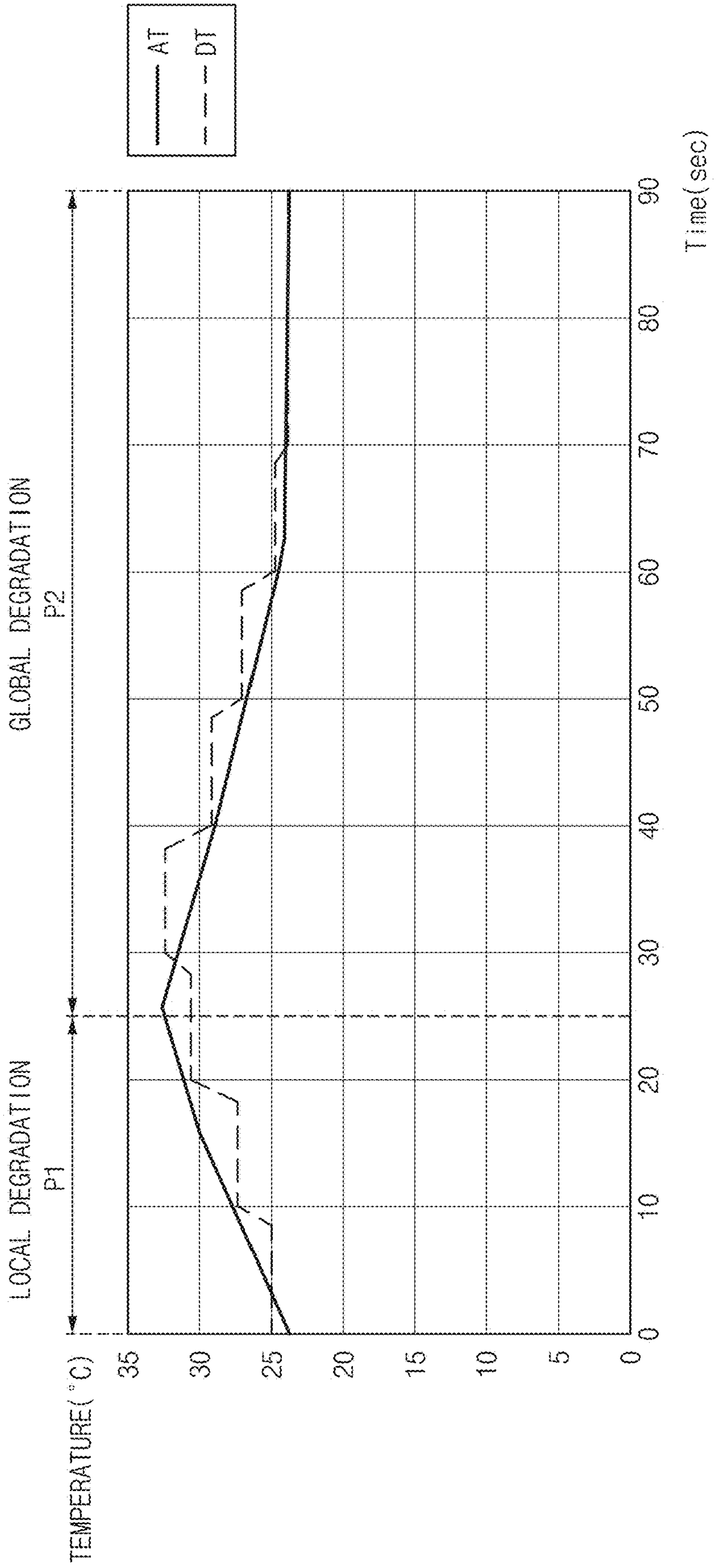
FIG. 10 is a graph showing a sensing operation of a current sensor of FIG. 1 according to a comparative example of the present disclosure.

FIG. 10 is a graph showing a sensing operation of a current sensor 600 of FIG. 1 according to a comparative example of the present disclosure.

Referring to FIGS. 1 to 10, when the local pattern causing the local degradation is applied to the display panel 100 as described in FIG. 4, and then the global pattern having the low grayscale is applied to the display panel 100, the temperature AT of the first area A1 may increase and then decrease. In this case, a decrease speed of the temperature AT of the first area A1 may be relatively greater than an increase speed of the temperature AT of the first area A1. Hereinafter, for convenience of explanation, the temperature AT of the first area A1 is described as the temperature AT of the pixels PX or the temperature AT of the blocks BLK.

As described in FIG. 5, when the local degradation progresses, the current sensor 600 may perform the sensing operation, and the driving controller 200 may reduce the input grayscale IG based on a determination temperature DT of the blocks BLK determined based on the sensing operation of the current sensor 600, and the data driver 500 may output the compensated data voltage VDATA to the pixels PX to perform the stain compensation. Specifically, when the driving current IDR is large, the determination temperature DT may be large, and the driving controller 200 may compensate for the input image data IMG for blocks BLK having a large determination temperature DT. As the determination temperature DT is large, a compensation amount for the data voltage VDATA may increase.

Figure 12:
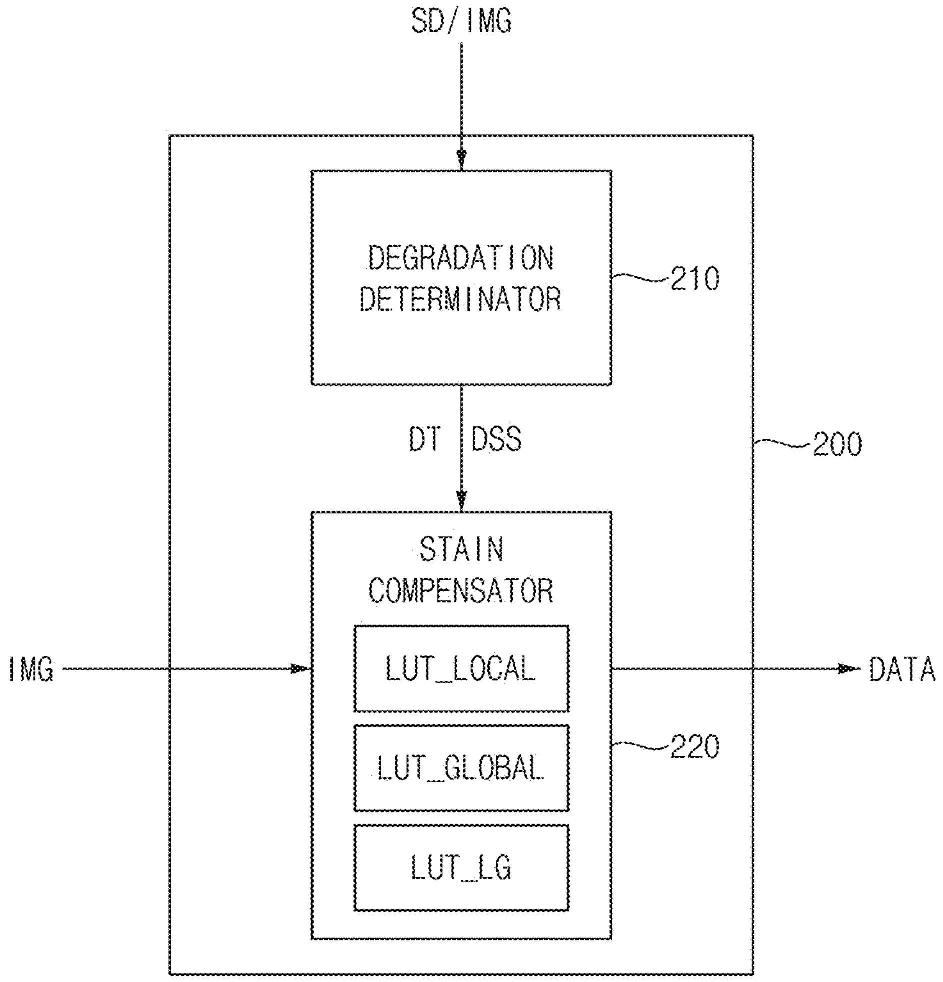
FIG. 12 is a block diagram showing a driving controller of FIG. 1.

To determine when to apply a large compensation amount, the driving controller 200 may use a thermal map (e.g., a local lookup table LUT_LOCAL and a global lookup table LUT_GLOBAL as shown in FIG. 12) to identify blocks where the determination temperature DT exceeds a predetermined temperature threshold. For such blocks, the driving controller 200 may apply a compensation amount that corresponds to the determination temperature DT, based on a thermal map, in which relatively higher determination temperatures DT are mapped to proportionally higher compensation amounts.

For example, an electronic device including the display panel 100 and the driving controller 200 may store the thermal map, which defines multiple temperature thresholds (e.g., a first temperature threshold TH1, a second temperature threshold TH2, and a third temperature threshold TH3, where TH3>TH2>TH1), each mapped to a corresponding compensation amount (e.g., a first compensation amount C1, a second compensation amount C2, and a third compensation amount C3, where C3>C2>C1). When the determination temperature DT is below the first temperature threshold TH1, the first compensation amount C1 may be applied. When the determination temperature DT falls between the second temperature threshold TH2 and the third temperature threshold TH3, the second compensation amount C2 may be applied. When the determination temperature DT is greater than the third temperature threshold TH3, the third compensation amount C3 may be applied.

In another embodiment, the driving controller 200 may compute the compensation amount as a function of the determination temperature DT, where the compensation amount increases either linearly or non-linearly (e.g., in a step-wise manner) as the determination temperature DT increases.

For example, as shown in FIG. 10, the sensing operation of the current sensor 600 may be performed every 10 seconds in the first period P1 in which the local degradation progresses and the second period P2 in which the global degradation with the low grayscale progresses, such that the temperature AT of the blocks BLK may be determined. Here, the temperature AT of the blocks BLK may be an actual temperature of the blocks BLK, and the determination temperature DT of the blocks BLK may be a temperature determined by calculating the actual temperature of the blocks BLK. Since the temperature AT of the blocks BLK is a continuous value, but the determination temperature DT of the blocks BLK is a discrete value, the determination temperature DT of the blocks BLK may have an error with the temperature AT of the blocks BLK.

Meanwhile, as described above, the decrease speed of the temperature AT of the blocks BLK may be relatively greater than the increase speed of the temperature AT of the blocks BLK. Therefore, the determination temperature DT of the blocks BLK may have a relatively small error in the first period P1, but may have a relatively large error in the second period P2. Accordingly, the stain compensation may be accurate in the first period P1, but may be inaccurate in the second period P2, and the display quality may deteriorate in the second period P2.

The display device according to embodiments of the present disclosure aims to improve the display quality not only in the first period P1 where the local degradation progresses, but also in the second period P2 where the global degradation with the low grayscale progresses.

Figure 11:
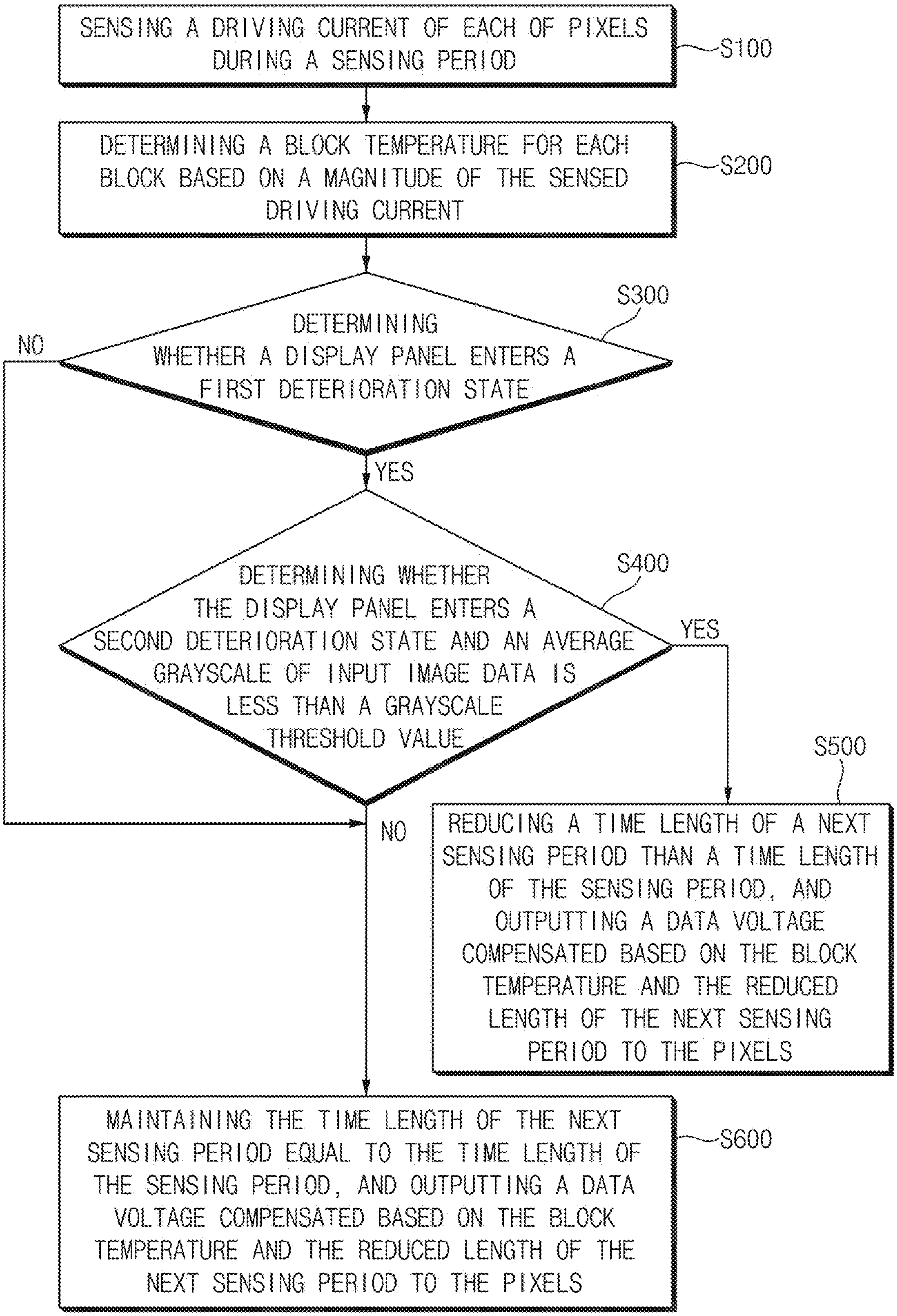
FIG. 11 is a flowchart showing a method of driving a display device of FIG. 1.
Figure 13:
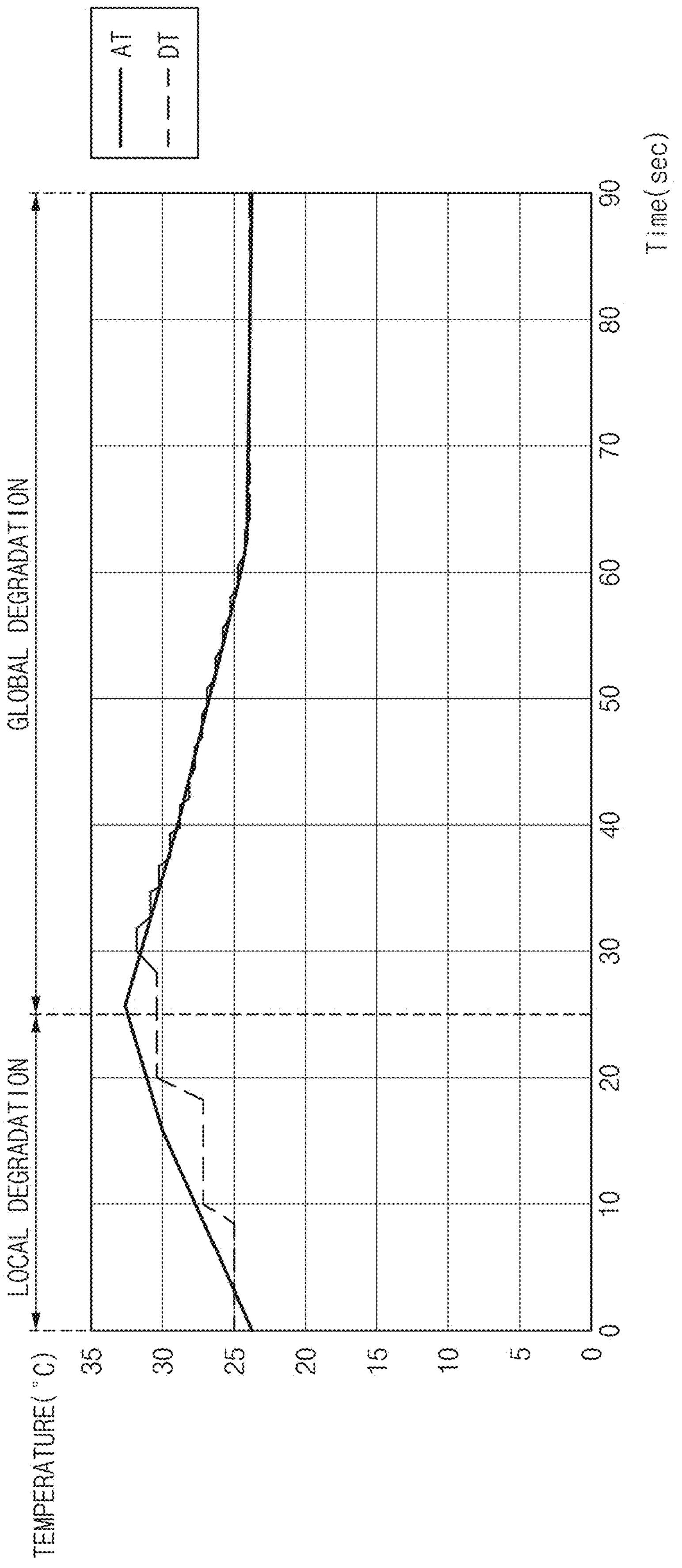
FIG. 13 is a graph showing a sensing operation of a current sensor of FIG. 1 according to an embodiment of the present disclosure.

FIG. 11 is a flowchart showing a method of driving a display device of FIG. 1. FIG. 12 is a block diagram showing a driving controller 200 of FIG. 1. FIG. 13 is a graph showing a sensing operation of a current sensor 600 of FIG. 1 according to an embodiment of the present disclosure.

Referring to FIGS. 1 to 13, a method of driving a display device includes sensing a driving current of each of pixels PX included in a display panel 100, which is divided into blocks BLK, during a sensing period (step S100), determining a block temperature AT for each block based on a magnitude of the sensed driving current IDR (step S200), determining whether the display panel 100 enters a first deterioration state in which a difference between a maximum value of the block temperature DT and an average value of the block temperature DT is greater than a first temperature threshold value (step S300), determining whether the display panel 100 enters a second deterioration state in which the difference between the maximum value of the block temperature DT and the average value of the block temperature DT is less than a second temperature threshold value different from the first temperature threshold value, and an average grayscale of input image data IMG is less than a grayscale threshold value (step S400), and reducing a time length of a next sensing period after the sensing period than a time length of the sensing period, and outputting a data voltage compensated based on the block temperature DT and the reduced length of the next sensing period to the pixels, when it is determined that after the display panel 100 enters the first deterioration state, the display panel 100 enters the second deterioration state and the average grayscale of the input image data IMG is less than the grayscale threshold value (step S500).

In an embodiment, the method of driving the display device may further include maintaining the time length of the next sensing period equal to the time length of the sensing period, and compensating for the data voltage VDATA based on the block temperature DT and the maintained time length of the next sensing period, when it is determined that the display panel 100 does not enter the first deterioration state (step 600).

In an embodiment, the method of driving the display device may further include maintaining the time length of the next sensing period equal to the time length of the sensing period, and compensating for the data voltage VDATA based on the block temperature DT and the maintained time length of the next sensing period, when it is determined that after the display panel 100 enters the first deterioration state, the display panel 100 does not enter the second deterioration state (step 700).

In an embodiment, the method of driving the display device may further include maintaining the time length of the next sensing period equal to the time length of the sensing period, and compensating for the data voltage VDATA based on the block temperature DT and the maintained time length of the next sensing period, when it is determined that after the display panel 100 enters the first deterioration state, the display panel 100 enters the second deterioration state and the average grayscale of the input image data IMG is not less than the grayscale threshold (step 600).

The current sensor 600 may sense the driving current IDR of each of the pixels PX during the sensing period and the next sensing period after the sensing period. The current sensor 600 may generate sensing data SD based on the driving current IDR of each of the pixels PX.

The driving controller 200 may include a deterioration determinator 210 and a stain compensator 220.

The deterioration determinator 210 may determine the block temperature AT based on the sensing data SD and output the block temperature DT. In addition, the deterioration determinator 210 may determine the deterioration state of the display panel 100 based on the input grayscale IG which is the grayscale of the input image data IMG or the sensing data SD and output a deterioration state signal DSS. The deterioration state may include local deterioration in which the temperature AT of the display panel 100 locally increases and global deterioration in which the temperature AT of the display panel 100 increases overall.

In an embodiment, the deterioration determinator 210 may determine the deterioration state of the display panel 100 based on the input grayscale IG. In this case, the deterioration determinator 210 may analyze a pattern indicated by the input grayscale IG to determine the deterioration state of the display panel 100.

In an embodiment, the deterioration determinator 210 may determine the deterioration state of the display panel 100 based on the sensing data SD. In this case, when a difference between the maximum value of the block temperature DT included in the display panel 100 and the average value of the block temperature DT is greater than a first temperature threshold value, the deterioration determinator 210 may determine that the display panel 100 has suffered the local deterioration. In addition, when a difference between the maximum value of the block temperature DT included in the display panel 100 and the average value of the block temperature DT is less than a second temperature threshold value, the deterioration determinator 210 may determine that the display panel 100 has suffered the global deterioration. The second temperature threshold may be different from the first temperature threshold. For example, the second temperature threshold may be less than the first temperature threshold.

The stain compensator 220 may compensate for the input image data IMG based on the determination temperature DT and the deterioration state signal DSS to generate the data signal DATA. The stain compensator 220 may determine whether after the display panel 100 enters the local deterioration, the display panel 100 enters the global deterioration the input image data IMG has the low grayscale. In this case, when the input grayscale IG is less than the grayscale threshold value, the stain compensator 220 may determine that the input image data IMG has the low grayscale.

For example, when the stain compensator 220 determines that after the display panel 100 enters the local degradation, the display panel 100 enters the global degradation and the input image data IMG has the low grayscale, as shown in FIG. 13, the time length of the next sensing period after the sensing period is reduced than the time length of the sensing period, and the input image data IMG is compensated based on the block temperature DT and the reduced sensing period of the next sensing period to generate a compensated data signal DATA, and the data driver 500 may generate a compensated data voltage VDATA based on the compensated data signal DATA and output the compensated data signal DATA to the pixels PX. The stain compensator 220 may compensate for the input image data IMG for blocks BLK in which the block temperature DT is greater than the average value of the block temperature DT to generate the compensated data signal DATA, and a data driver 500 may generate the compensated data voltage VDATA based on the compensated data signal DATA and output the compensated data voltage VDATA to the pixels PX. As the block temperature DT is large, a compensation amount for the data voltage VDATA may increase. On the other hand, the stain compensator 220 may not compensate for the input image data IMG for blocks BLK in which the block temperature DT is less than or equal to the average value of the block temperature DT. In this case, the stain compensator 220 may use a local global lookup table LUT_LG which stores a data signal DATA according to the block temperature DT and the input grayscale IG.

For example, when it is determined that the display panel 100 does not enter local degradation, as shown in FIG. 10, the stain compensator 220 may maintain the time length of the next sensing period to be equal to the time length of the sensing period, and compensate for the input image data IMG based on the block temperature DT and the maintained time length of the next sensing period to generate the compensated data signal DATA, and the data driver 500 may generate the compensated data voltage VDATA based on the compensated data signal DATA and output the compensated data voltage VDATA to the pixels PX. The stain compensator 220 may compensate for the input image data IMG for all of the blocks BLK to generate the compensated data signal DATA, and the data driver 500 may generate the compensated data voltage VDATA based on the compensated data signal DATA and output the compensated data voltage VDATA to the pixels PX. As the block temperature DT is large (e.g., when the block temperature DT exceeds a predetermined temperature threshold), the stain compensator 220 may increase the compensation amount for the data voltage VDATA. In this case, the stain compensator 220 may use a global lookup table LUT_GLOBAL which stores a data signal DATA according to the block temperature DT and the input grayscale IG.

For example, when it is determined that after the display panel 100 enters the local degradation, the display panel 100 does not the global degradation, as shown in FIG. 10, the stain compensator 220 may maintain the time length of the next sensing period equal to the time length of the sensing period, and compensate for the input image data IMG based on the block temperature DT and the maintained time length of the next sensing period to generate the compensated data signal DATA, and the data driver 500 may generate a compensated data voltage VDATA based on the compensated data signal DATA and output the compensated data voltage VDATA to the pixels PX. The stain compensator 220 may compensate the input image data IMG for all of the blocks BLK to generate the compensated data signal DATA, and the data driver 500 may generate a compensated data voltage VDATA based on the compensated data signal DATA and output the compensated data voltage VDATA to the pixels PX. As the block temperature DT is large (e.g., when the block temperature DT exceeds a predetermined temperature threshold), the stain compensator 220 may increase the compensation amount for the data voltage VDATA. In this case, the stain compensator 220 may use a local lookup table LUT_LOCAL which stores a data signal DATA according to the block temperature DT and the input grayscale IG.

For example, when it is determined that after the display panel enters the local degradation, the display panel 100 enters the global degradation and the input image data does not have the low grayscale, as shown in FIG. 10, the stain compensator 220 may maintain the time length of the next sensing period equal to the time length of the sensing period, and compensate for the input image data IMG based on the block temperature DT and the maintained time length of the next sensing period to generate the compensated data signal DATA, and the data driver 500 may generate a compensated data voltage VDATA based on the compensated data signal DATA and output the compensated data voltage VDATA to the pixels PX. The stain compensator 220 may compensate for the input image data IMG for all of the blocks BLK to generate the compensated data signal DATA, and the data driver 500 may generate the compensated data voltage VDATA based on the compensated data signal DATA and output the compensated data voltage VDATA to the pixels PX. As the block temperature DT is large (e.g., when the block temperature DT exceeds a predetermined temperature threshold), the stain compensator 220 may increase the compensation amount for the data voltage VDATA. In this case, the stain compensator 220 may use the local lookup table LUT_LOCAL which stores the data signal DATA according to the block temperature DT and the input grayscale IG.

In summary, here, each sensing operation of the current sensor 600 may be performed with a specific time length. For example, the sensing operation of the current sensor 600 may be performed with the time length of the sensing period in the sensing period, and may be performed with the time length of the next sensing period in the next sensing period after the sensing period. The stain compensator 220 may adjust the time length of the next sensing period after the sensing period based on the block temperature DT in the sensing period. As such, when after the display panel 100 enters the local deterioration, the display panel 100 enters the global deterioration and the input image data IMG has the low grayscale, temperature sensing may be performed precisely such that a display quality may be improved.

Figure 14:
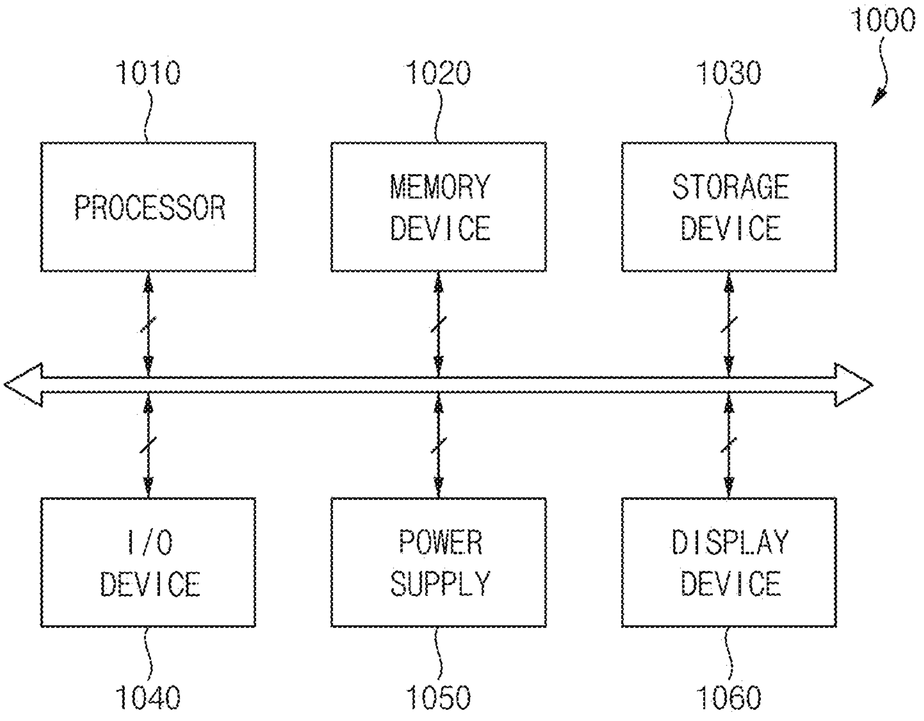
FIG. 14 is a block diagram showing an electronic device according to an embodiment of the present disclosure.
Figure 15:
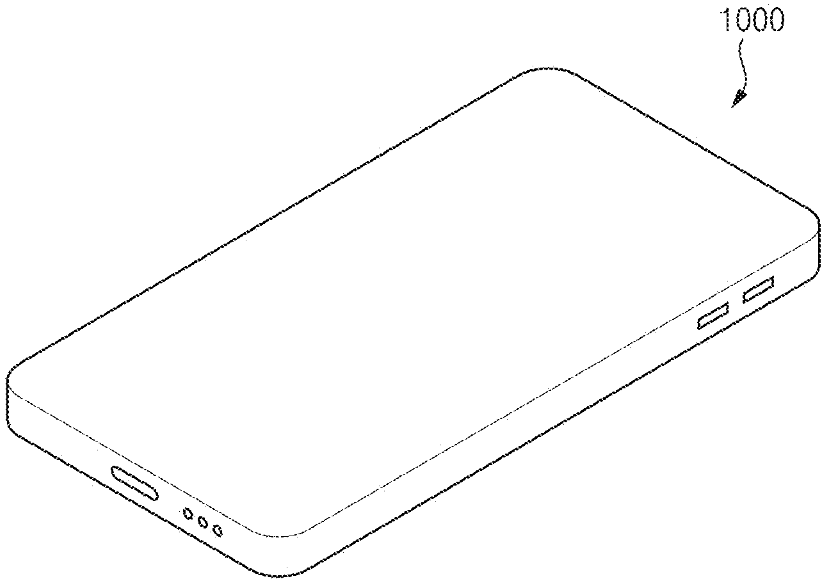
FIG. 15 is a diagram showing an example in which an electronic device of FIG. 20 is implemented as a smart phone.

FIG. 14 is a block diagram showing an electronic device 1000 according to an embodiment of the present disclosure. FIG. 15 is a diagram showing an example in which an electronic device 1000 of FIG. 20 is implemented as a smart phone.

Referring to FIGS. 1 to 15, the electronic device 1000 may include a processor 1010, a memory device 1020, a storage device 1030, an input/output (I/O) device 1040, a power supply 1050 and a display device 1060. Here, the display device 1060 may be the display device of FIG. 1. In addition, the electronic device 1000 may further include a plurality of ports for communicating with a video card, a sound card, a memory card, a universal serial bus (USB) device, other electronic devices, etc.

In an embodiment, as shown in FIG. 21, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display device 1060 may be included in the I/O device 1040. The power supply 1050 may provide power for operations of the electronic device 1000. The display device 1060 may be coupled to other components via the buses or other communication links.

Figure 16:
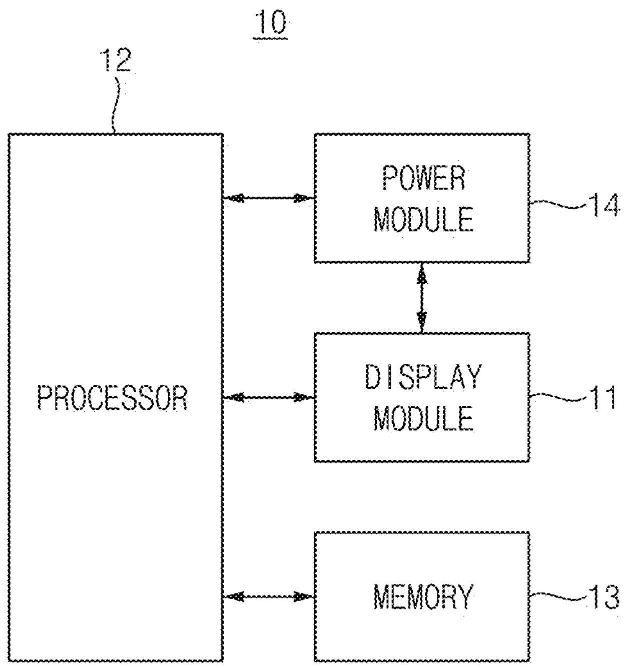
FIG. 16 is a block diagram showing an electronic device according to an embodiment of the present disclosure.
Figure 17:
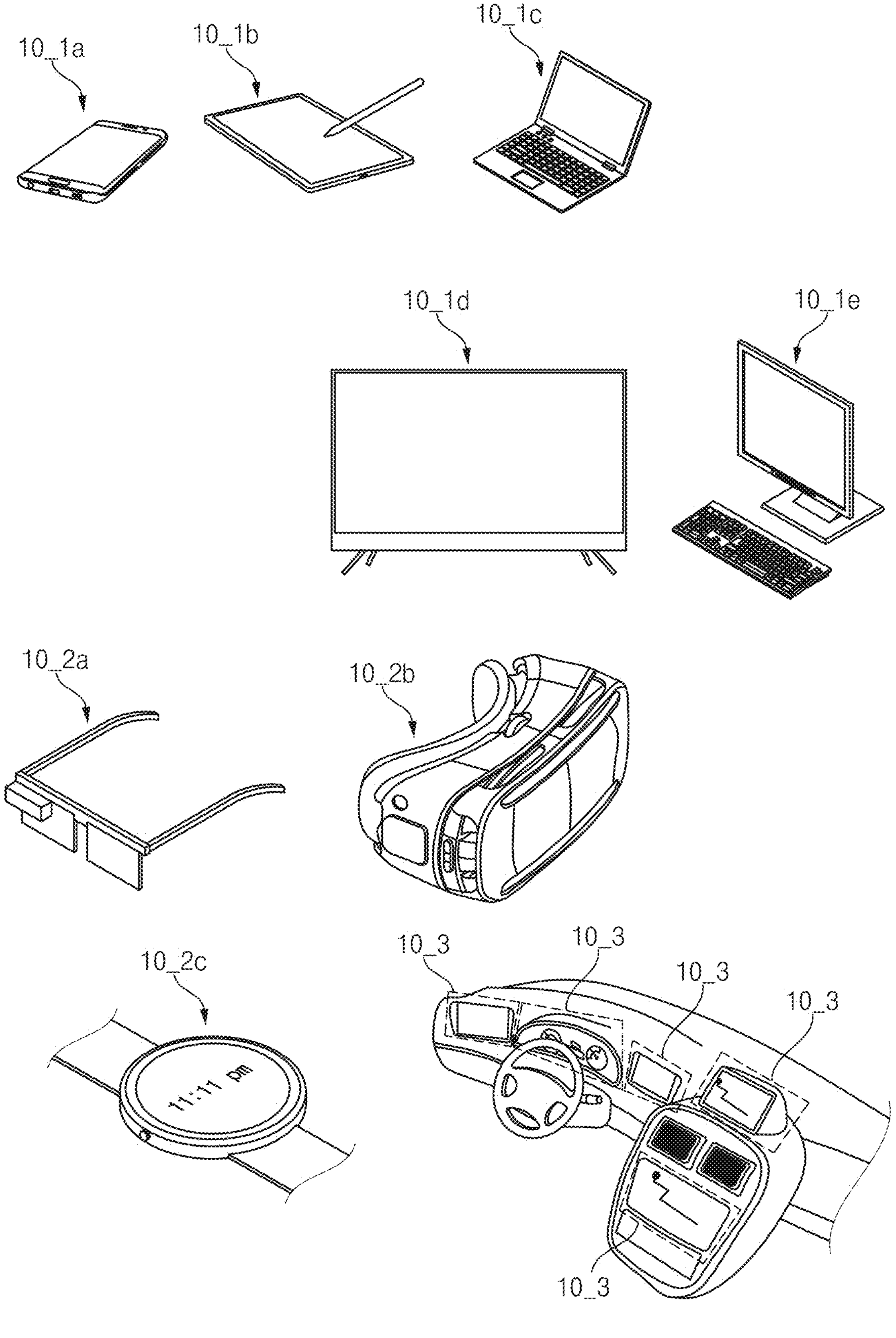
FIG. 17 is schematic diagrams showing the electronic devices of FIG. 16.

FIG. 16 is a block diagram showing an electronic device 10 according to an embodiment of the present disclosure. FIG. 17 is schematic diagrams showing the electronic devices of FIG. 16.

Referring to FIG. 16, the electronic device 10 according to an embodiment may include a display module 11, a processor 12, a memory 13 and a power module 14.

The display device according to the embodiment of the present disclosure may be applied to various electronic devices.

In an embodiment, the electronic device 10 may include the display device of FIG. 1. An operation of the display device included in the electronic device 10 may be the same as the operation of the display device explained referring to FIGS. 1 to 13. The electronic device 10 may further include a module or an device having additional functions in addition to the display device.

The processor 12 may include at least one of a central processing unit (CPU), an application processor (AP), a graphic processing unit (GPU), a communication processor (CP), an image signal processor (ISP) and a controller.

In an embodiment, the processor 12 may provide the input control signal CONT of FIG. 1 and the input image data IMG of FIG. 1 to the driving controller 200 included in the display device of FIG. 1.

In an embodiment, the processor 12 may be divided into two or more in a functional or structural perspective. For example, the processor 12 may include a main processor, which is a first driving chip type, including the central processing unit and an auxiliary processor, which is a second driving chip type, including a controller receiving an image signal from the main processor and processing the image signal to match interface specifications of the display module 11. For example, the auxiliary processor may include the driving controller 200 included in the display device of FIG. 1. Thus, the main processor may provide the input control signal CONT of the FIG. 1 and the input image data IMG of FIG. 1 to the auxiliary processor. The auxiliary processor may process the image signal based on the input control signal CONT and the input image data IMG.

The memory 13 may include at least one of a nonvolatile memory and a volatile memory. Data information required for the operation of the processor 12 or the display module 11 may be stored in the memory 13. When the processor 12 executes an application stored in the memory 13, the input control signal CONT and/or the input image data IMG may be transmitted to the display module 11 and the display module 11 may process the input control signal CONT and/or the input image data IMG and may output image information through a display area. The display module 11 may include organic light emitting diodes, quantum-dot organic light emitting diodes, micro-light-emitting diodes, nano-light-emitting diodes, liquid crystals, not being limited thereto.

The power module 14 may include a power supply, such as a power adapter or a battery device, and a power converter converting power supplied by the power supply to generate a power required for the operation of the electronic device 10.

At least one of the elements of the electronic device 10 may be included in the display device according to embodiments of the present disclosure. In addition, a part of a single functional module may be included in the display device and another part of the single functional module may be disposed out of the display device. For example, the display module 11 may be included in the display device but the processor 12, the memory 13 and the power module 14 may be included in another device in the electronic device 10 which is not the display device.

Referring to FIG. 17, the various electronic devices including the display device according to the present embodiments may include electronic devices for displaying image such as a smartphone 10_1*a*, a tablet PC 10_1*b*, a laptop 10_1*c*, a television 10_1*d*, a desktop monitor 10_1*e*, wearable electronic devices including a display module such as smart glasses 10_2*a*, a head mounted display 10_2*b* and a smart watch 10_2*c* and vehicle electronic devices 10_3 including display modules such as a CID (center information display), a room mirror display disposed on an instrument panel, center fascia, and a dashboard of a vehicle. The electronic device 10 may not be limited to the electronic devices for displaying image, the wearable electronic devices and the vehicle electronic devices 10_3.

According to the driver, the display device including the driver and the electronic device including the driver of the present embodiment as explained above, the power consumption of the display device may be reduced.

At least one of the components, elements, modules or units (collectively "components" in this paragraph) represented by a block or an equivalent indication in the drawings including FIG. 1 may be implemented or embodied by analog and/or digital circuits including one or more of a logic gate, an integrated circuit, a microprocessor, a microcontroller, a memory circuit, a passive electronic component, an active electronic component, an optical component, and the like. Alternatively or additionally, these components may be implemented or embodied by software including one or more instructions stored in an internal or external storage medium that is readable by at least one processor. For example, the at least one processor may invoke at least one of the one or more instructions stored in the storage medium, and execute it, with or without using one or more other components under the control of the at least one processor. This allows the at least one processor to perform at least one function or operation described above as being performed by each of the components according to the at least one instruction invoked. Here, the at least one processor may include a central processing unit, a graphic processing unit, another type of microprocessor, not being limited thereto.

In one or more embodiments of the disclosure, a display device may include: a display panel including pixels grouped into blocks; and a display panel driver configured to: sense a driving current of each of the pixels during a sensing period; determine a block temperature for each of the blocks based on a magnitude of the sensed driving current; determine whether after the display panel enters a first deterioration state in which a difference between a maximum value of the block temperature and an average value of the block temperature is greater than a first temperature threshold value, the display panel enters a second deterioration state in which the difference between the maximum value of the block temperature and the average value of the block temperature is less than a second temperature threshold value different from the first temperature threshold value, and an average grayscale of input image data is less than a grayscale threshold value; and output a data voltage compensated based on the block temperature to the pixels. Based on a determination that the display panel has transitioned from the first deterioration state to the second deterioration state, and that the average grayscale of the input image data is less than the grayscale threshold value, the display panel driver is configured to reduce a time length of a next sensing period after the sensing period, to be less than a time length of the sensing period, and output the data voltage compensated based on the block temperature and the reduced length of the next sensing period to the pixels.

During a blank period of a frame period including an active period in which the data voltage is applied to the pixels and the blank period in which the data voltage is not applied to the pixels, the display panel driver is configured to randomly select one of the blocks as a sensing block and sense the driving current of each of pixels included in the sensing block.

The display panel driver is configured to sense the driving current of each of the pixels included in at least one of pixel rows included in the sensing block.

A block temperature of the sensing block increases as the driving current increases.

The display panel driver is configured to determine whether the display panel enters the first deterioration state or the second deterioration state, based on a grayscale of the input image data.

Each of the pixels includes a first sub-pixel, a second sub-pixel, and a third sub-pixel, and the display panel driver is configured to sense a driving current of at least one of the first to third sub-pixels.

The at least one of the first to third sub-pixels is a red sub-pixel.

Based on the determination that the display panel has transitioned from the first deterioration state to the second deterioration state and the average grayscale of the input image data is less than the grayscale threshold value, the display panel driver is configured to compensate for the data voltage for blocks having the block temperature greater than the average value of the block temperature, and not compensate for the data voltage for blocks having the block temperature less than or equal to the average value of the block temperatures.

Based on the block temperature exceeding a predetermined temperature threshold, the display panel driver is further configured to increase a compensation amount for the data voltage.

Based on a determination that the display panel does not enter the first deterioration state, the display panel driver is configured to maintain the time length of the next sensing period equal to the time length of the sensing period, and compensate for the data voltage based on the block temperature and the maintained time length of the next sensing period.

Based on the determination that the display panel does not enter the first deterioration state, the display panel driver is configured to compensate for the data voltage for all of the blocks.

Based on the block temperature exceeding a predetermined temperature threshold, the display panel driver is further configured to increase a compensation amount for the data voltage.

Based on a determination that after the display panel enters the first deterioration state, the display panel does not transition from the first deterioration state to the second deterioration state, the display panel driver is configured to maintain the time length of the next sensing period equal to the time length of the sensing period, and compensate for the data voltage based on the block temperature and the maintained time length of the next sensing period.

Based on the determination that after the display panel enters the first deterioration state, the display panel does not transition from the first deterioration state to the second deterioration state, the display panel driver is configured to compensate for the data voltage for all of the blocks.

Based on the block temperature exceeding a predetermined temperature threshold, the display panel driver is further configured to increase a compensation amount for the data voltage.

In one or more embodiments of the present disclosure, a method of driving a display device may include: sensing a driving current of each of pixels included in a display panel during a sensing period, the pixels being grouped into blocks; determining a block temperature for each of the blocks based on the sensed driving current; determining whether the display panel enters a first deterioration state in which a difference between a maximum value of the block temperature and an average value of the block temperature is greater than a first temperature threshold value; determining whether the display panel enters a second deterioration state in which the difference between the maximum value of the block temperature and the average value of the block temperature is less than a second temperature threshold value different from the first temperature threshold value, and an average grayscale of input image data is less than a grayscale threshold value; and based on a determination that the display panel has transitioned from the first deterioration state to the second deterioration state, and the average grayscale of the input image data is less than the grayscale threshold value, reducing a time length of a next sensing period after the sensing period to be less than a time length of the sensing period, and outputting a data voltage compensated based on the block temperature and the reduced length of the next sensing period to the pixels.

The method may further include: based on a determination that the display panel does not enter the first deterioration state, maintaining the time length of the next sensing period equal to the time length of the sensing period, and compensating for the data voltage based on the block temperature and the maintained time length of the next sensing period.

The method may further include: based on a determination that after the display panel enters the first deterioration state, the display panel does not transition from the first deterioration state to the second deterioration state, maintaining the time length of the next sensing period equal to the time length of the sensing period, and compensating for the data voltage based on the block temperature and the maintained time length of the next sensing period.

The method may further include: based on a determination that the display panel has transitioned from the first deterioration state to the second deterioration state, and the average grayscale of the input image data is not less than the grayscale threshold value, maintaining the time length of the next sensing period equal to the time length of the sensing period, and compensating for the data voltage based on the block temperature and the maintained time length of the next sensing period.

In one or more embodiments of the present disclosure, an electronic device may include: a display panel including pixels grouped into blocks; a display panel driver configured to: sense a driving current of each of the pixels during a sensing period; determine a block temperature for each of the blocks based on a magnitude of the sensed driving current; determine whether after the display panel enters a first deterioration state in which a difference between a maximum value of the block temperature and an average value of the block temperature is greater than a first temperature threshold value, the display panel enters a second deterioration state in which the difference between the maximum value of the block temperature and the average value of the block temperature is less than a second temperature threshold value different from the first temperature threshold value, and an average grayscale of input image data is less than a grayscale threshold value; and output a data voltage compensated based on the block temperature to the pixels; and a processor configured to control the display panel driver. Based on a determination that the display panel has transitioned from the first deterioration state to the second deterioration state, and that the average grayscale of the input image data is less than the grayscale threshold value, the display panel driver is configured to reduce a time length of a next sensing period after the sensing period, to be less than a time length of the sensing period, and output the data voltage compensated based on the block temperature and the reduced length of the next sensing period to the pixels.

The foregoing is illustrative of the present disclosure and is not to be construed as limiting thereof. Although a few example embodiments of the present disclosure have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific example embodiments disclosed, and that modifications to the disclosed example embodiments, as well as other example embodiments, are intended to be included within the scope of the appended claims. The present disclosure is defined by the following claims, with equivalents of the claims to be included therein.

What is claimed is:

1. A display device, comprising:

a display panel comprising pixels grouped into blocks; and a display panel driver configured to:

sense a driving current of each of the pixels during a sensing period;

determine a block temperature for each of the blocks based on a magnitude of the sensed driving current;

determine whether after the display panel enters a first deterioration state in which a difference between a maximum value of the block temperature and an average value of the block temperature is greater than a first temperature threshold value, the display panel enters a second deterioration state in which the difference between the maximum value of the block temperature and the average value of the block temperature is less than a second temperature threshold value different from the first temperature threshold value, and an average grayscale of input image data is less than a grayscale threshold value; and output a data voltage compensated based on the block temperature to the pixels, wherein, based on a determination that the display panel has transitioned from the first deterioration state to the second deterioration state, and that the average grayscale of the input image data is less than the grayscale threshold value, the display panel driver is configured to reduce a time length of a next sensing period after the sensing period, to be less than a time length of the sensing period, and output the data voltage compensated based on the block temperature and the reduced time length of the next sensing period to the pixels.

2. The display device of claim 1, wherein, during a blank period of a frame period including an active period in which the data voltage is applied to the pixels and the blank period in which the data voltage is not applied to the pixels, the display panel driver is configured to randomly select one of the blocks as a sensing block and sense the driving current of each of pixels included in the sensing block.

3. The display device of claim 2, wherein the display panel driver is configured to sense the driving current of each of the pixels included in at least one of pixel rows included in the sensing block.

4. The display device of claim 2, wherein a block temperature of the sensing block increases as the driving current increases.

5. The display device of claim 1, wherein the display panel driver is configured to determine whether the display panel enters the first deterioration state or the second deterioration state, based on a grayscale of the input image data.

6. The display device of claim 1, wherein each of the pixels includes a first sub-pixel, a second sub-pixel, and a third sub-pixel, and the display panel driver is configured to sense a driving current of at least one of the first to third sub-pixels.

7. The display device of claim 6, wherein the at least one of the first to third sub-pixels is a red sub-pixel.

8. The display device of claim 1, wherein, based on the determination that the display panel has transitioned from the first deterioration state to the second deterioration state and the average grayscale of the input image data is less than the grayscale threshold value, the display panel driver is configured to compensate for the data voltage for blocks having the block temperature greater than the average value of the block temperature, and not compensate for the data voltage for blocks having the block temperature less than or equal to the average value of the block temperatures.

9. The display device of claim 8, wherein, based on the block temperature exceeding a predetermined temperature threshold, the display panel driver is further configured to increase a compensation amount for the data voltage.

10. The display device of claim 1, wherein, based on a determination that the display panel does not enter the first deterioration state, the display panel driver is configured to maintain the time length of the next sensing period equal to the time length of the sensing period, and compensate for the data voltage based on the block temperature and the maintained time length of the next sensing period.

11. The display device of claim 10, wherein, based on the determination that the display panel does not enter the first deterioration state, the display panel driver is configured to compensate for the data voltage for all of the blocks.

12. The display device of claim 11, wherein, based on the block temperature exceeding a predetermined temperature threshold, the display panel driver is further configured to increase a compensation amount for the data voltage.

13. The display device of claim 1, wherein, based on a determination that after the display panel enters the first deterioration state, the display panel does not transition from the first deterioration state to the second deterioration state, the display panel driver is configured to maintain the time length of the next sensing period equal to the time length of the sensing period, and compensate for the data voltage based on the block temperature and the maintained time length of the next sensing period.

14. The display device of claim 13, wherein, based on the determination that after the display panel enters the first deterioration state, the display panel does not transition from the first deterioration state to the second deterioration state, the display panel driver is configured to compensate for the data voltage for all of the blocks.

15. The display device of claim 14, wherein, based on the block temperature exceeding a predetermined temperature threshold, the display panel driver is further configured to increase a compensation amount for the data voltage.

16. A method of driving a display device, the method comprising:

sensing a driving current of each of pixels included in a display panel during a sensing period, the pixels being grouped into blocks;

determining a block temperature for each of the blocks based on the sensed driving current;

determining whether the display panel enters a first deterioration state in which a difference between a maximum value of the block temperature and an average value of the block temperature is greater than a first temperature threshold value;

determining whether the display panel enters a second deterioration state in which the difference between the maximum value of the block temperature and the average value of the block temperature is less than a second temperature threshold value different from the first temperature threshold value, and an average grayscale of input image data is less than a grayscale threshold value; and based on a determination that the display panel has transitioned from the first deterioration state to the second deterioration state, and the average grayscale of the input image data is less than the grayscale threshold value, reducing a time length of a next sensing period after the sensing period to be less than a time length of the sensing period, and outputting a data voltage compensated based on the block temperature and the reduced time length of the next sensing period to the pixels.

17. The method of claim 16, wherein the method further comprises:

based on a determination that the display panel does not enter the first deterioration state, maintaining the time length of the next sensing period equal to the time length of the sensing period, and compensating for the data voltage based on the block temperature and the maintained time length of the next sensing period.

18. The method of claim 16, wherein the method further comprises:

based on a determination that after the display panel enters the first deterioration state, the display panel does not transition from the first deterioration state to the second deterioration state, maintaining the time length of the next sensing period equal to the time length of the sensing period, and compensating for the data voltage based on the block temperature and the maintained time length of the next sensing period.

19. The method of claim 16, wherein the method further comprises:

based on a determination that the display panel has transitioned from the first deterioration state to the second deterioration state, and the average grayscale of the input image data is not less than the grayscale threshold value, maintaining the time length of the next sensing period equal to the time length of the sensing period, and compensating for the data voltage based on the block temperature and the maintained time length of the next sensing period.

20. An electronic device, comprising:

a display panel comprising pixels grouped into blocks;

a display panel driver configured to:

sense a driving current of each of the pixels during a sensing period;

determine a block temperature for each of the blocks based on a magnitude of the sensed driving current;

determine whether after the display panel enters a first deterioration state in which a difference between a maximum value of the block temperature and an average value of the block temperature is greater than a first temperature threshold value, the display panel enters a second deterioration state in which the difference between the maximum value of the block temperature and the average value of the block temperature is less than a second temperature threshold value different from the first temperature threshold value, and an average grayscale of input image data is less than a grayscale threshold value; and output a data voltage compensated based on the block temperature to the pixels; and a processor configured to control the display panel driver, wherein, based on a determination that the display panel has transitioned from the first deterioration state to the second deterioration state, and that the average grayscale of the input image data is less than the grayscale threshold value, the display panel driver is configured to reduce a time length of a next sensing period after the sensing period, to be less than a time length of the sensing period, and output the data voltage compensated based on the block temperature and the reduced time length of the next sensing period to the pixels.

* * * * *